United States Patent
Metzger et al.

(10) Patent No.: US 7,654,287 B1
(45) Date of Patent: *Feb. 2, 2010

(54) DUAL SLIDE GATE VALVE AND METHOD FOR USING SAME

(75) Inventors: Greg P. Metzger, Escondido, CA (US); Fred O. Enstrom, Escondido, CA (US); Scott W. Randolph, Chino Hills, CA (US); Duane R. Condon, Ramona, CA (US); Thomas L. Kendall, San Marcos, CA (US); Larry D. Brown, San Diego, CA (US); Dennis L. Hart, Incline Village, CA (US)

(73) Assignee: Securus, Inc., Vista, CA (US)

( * ) Notice: Subject to any disclaimer, the term of this patent is extended or adjusted under 35 U.S.C. 154(b) by 444 days.

This patent is subject to a terminal disclaimer.

(21) Appl. No.: 11/505,675

(22) Filed: Aug. 17, 2006

Related U.S. Application Data

(63) Continuation of application No. 10/353,595, filed on Jan. 29, 2003, now Pat. No. 6,873,178, which is a continuation of application No. 10/706,578, filed on Nov. 12, 2003, now Pat. No. 6,997,041, which is a continuation of application No. 10/620,638, filed on Jul. 16, 2003, now abandoned, and a continuation-in-part of application No. 09/832,917, filed on Apr. 11, 2001, now Pat. No. 6,655,413.

(60) Provisional application No. 60/396,525, filed on Jul. 17, 2002.

(51) Int. Cl.
 *F16L 55/10* (2006.01)
(52) U.S. Cl. .................. 138/94.3; 138/94; 251/326; 137/269
(58) Field of Classification Search ............ 138/94, 138/94.3, 94.5; 251/326–329; 137/269
See application file for complete search history.

(56) References Cited

U.S. PATENT DOCUMENTS

| 1,054,150 A | 2/1913 | Thorsby |
| 1,133,714 A | 3/1915 | Elder |
| 1,161,997 A | 11/1915 | Thompson |

(Continued)

FOREIGN PATENT DOCUMENTS

| JP | 0055479 | 3/1989 |
| JP | 5099348 | 4/1993 |
| SU | 1610178 | 11/1990 |
| WO | 0101101 | 1/2001 |
| WO | WO0101101 | 1/2001 |

OTHER PUBLICATIONS

Counterclaim of Inflow Products, Inc. (Civil Action No. 07/CV0540 DMS RBB).

(Continued)

*Primary Examiner*—Patrick F Brinson
(74) *Attorney, Agent, or Firm*—Stetina Brunda Garred & Brucker; Lowell Anderson

(57) ABSTRACT

A method and device for pressure testing a pipe line is provided wherein a fitting is inserted into the pipeline by inserting male ends of the pipeline into female ends of the fitting to define a flow path through the fitting extending along a longitudinal axis. The fitting has an internal recess cooperating with a test slide to block flow through the fitting. An externally accessible port allows insertion and removal of the test slide. The test slide has an internal recess in which a pressure release slide moves to open a hole to release pressure, and to close the hole to block flow through the fitting for pressure testing. After testing and the release of the fluid test pressure, the test slide is removed and a finish slide is inserted into the recess. The finish slide has an opening located and configured to coincide with the flow path through the male ends of the pipes, and to block the recess to provide a substantially uniform, cylindrical flow path through the fitting.

21 Claims, 15 Drawing Sheets

U.S. PATENT DOCUMENTS

| | | | |
|---|---|---|---|
| 1,206,469 A | 11/1916 | Rockwell | |
| 1,357,974 A | * 11/1920 | Gorman | 138/94.3 |
| 1,928,316 A | 9/1933 | Muto | |
| 1,933,182 A | 10/1933 | Pagon et al. | |
| 2,031,151 A | 2/1936 | Eulberg | |
| 2,499,382 A | * 3/1950 | Hamer | 137/560 |
| 2,616,655 A | 11/1952 | Hamer | |
| 2,636,713 A | 4/1953 | Hamer | |
| 2,701,117 A | 2/1955 | Bashark | |
| 2,815,187 A | 12/1957 | Hamer | |
| 2,823,887 A | 2/1958 | Osinski | |
| 2,828,146 A | 3/1958 | Abbey | |
| 2,845,954 A | 8/1958 | Hamer | |
| 2,946,349 A | 7/1960 | Hamer | |
| 2,953,015 A | 9/1960 | Carrie | |
| 3,051,201 A | 8/1962 | Wilson | |
| 3,069,132 A | 12/1962 | Grove | |
| 3,232,577 A | 2/1966 | Sargent | |
| 3,316,929 A | 5/1967 | Milette | |
| 3,319,661 A | 5/1967 | Shindler | |
| 3,333,814 A | 8/1967 | Sargent | |
| 3,350,056 A | 10/1967 | Blumenkranz | |
| 3,737,180 A | 6/1973 | Hayes, Jr. et al. | |
| 3,770,301 A | 11/1973 | Adams | |
| 3,844,531 A | 10/1974 | Grengs | |
| 3,860,038 A | 1/1975 | Forni | |
| 3,941,349 A | 3/1976 | Pierson | |
| 3,945,604 A | 3/1976 | Clarkson | |
| 4,007,911 A | 2/1977 | Clarkson | |
| 4,019,371 A | 4/1977 | Chaplin et al. | |
| 4,112,969 A | 9/1978 | Still | |
| 4,124,231 A | 11/1978 | Ahlstone | |
| 4,176,756 A | 12/1979 | Gellman | |
| 4,194,721 A | 3/1980 | Nachtigahl | |
| 4,225,115 A | 9/1980 | Miller | |
| 4,271,870 A | 6/1981 | Butler | |
| D262,133 S | 12/1981 | Fain | |
| 4,343,332 A | 8/1982 | Williams, 3rd et al. | |
| 4,407,171 A | 10/1983 | Hasha et al. | |
| 4,429,568 A | 2/1984 | Sullivan | |
| 4,452,278 A | 6/1984 | Quinn | |
| 4,456,026 A | 6/1984 | Kantor | |
| 4,479,670 A | 10/1984 | Gabler | |
| 4,522,224 A | 6/1985 | Stalder et al. | |
| 4,531,710 A | 7/1985 | Tort | |
| 4,602,504 A | 7/1986 | Barber | |
| 4,643,226 A | 2/1987 | Balz | |
| 4,763,510 A | 8/1988 | Palmer | |
| 4,765,361 A | 8/1988 | Clifford | |
| 4,795,197 A | 1/1989 | Kaminski et al. | |
| 4,819,974 A | 4/1989 | Zeldler | |
| 4,895,181 A | 1/1990 | McKavanagh | |
| 4,944,484 A | 7/1990 | Hostetler | |
| 4,949,939 A | 8/1990 | Almada | |
| 5,004,210 A | 4/1991 | Sarno | |
| 5,018,768 A | 5/1991 | Palatchy | |
| 5,076,095 A | 12/1991 | Erhardt | |
| 5,195,722 A | 3/1993 | Bedner | |
| 5,197,324 A | 3/1993 | Keys | |
| 5,232,199 A | 8/1993 | Thrasher | |
| 5,269,568 A | 12/1993 | Courturler | |
| 5,287,730 A | 2/1994 | Condon | |
| 5,385,373 A | 1/1995 | Love | |
| 5,445,359 A | 8/1995 | Beson | |
| 5,464,035 A | 11/1995 | Heinecke | |
| 5,494,079 A | 2/1996 | Tiedemann | |
| 5,524,663 A | 6/1996 | Walsh et al. | |
| 5,653,423 A | 8/1997 | Young et al. | |
| 5,678,802 A | 10/1997 | Lunder | |
| 5,707,089 A | 1/1998 | Fend | |
| 5,782,499 A | 7/1998 | Gfrerer et al. | |
| 6,000,278 A | 12/1999 | Hystad | |
| D430,482 S | 9/2000 | Stout, Jr. | |
| 6,131,441 A | 10/2000 | Berube et al. | |
| 6,234,007 B1 | 5/2001 | Pampinella | |
| 6,299,216 B1 | 10/2001 | Thompson | |
| D451,984 S | 12/2001 | Tigerholm | |
| 6,422,064 B1 | 7/2002 | Pampinella | |
| 6,655,413 B2 | 12/2003 | Condon et al. | |
| 6,672,139 B2 | 1/2004 | Pampinella | |
| D488,852 S | 4/2004 | Pampinella | |
| 6,997,041 B1 | 2/2006 | Metzger et al. | |
| 7,325,442 B1 | 2/2008 | Pampinella et al. | |
| 7,398,675 B1 | 7/2008 | Metzger et al. | |
| 2001/0015092 A1 | 8/2001 | Pampinella | |
| 2002/0023482 A1 | 2/2002 | Pampinella | |
| 2002/0140222 A1 | 10/2002 | Pampinella | |
| 2004/0134260 A1 | 7/2004 | Pampinella et al. | |
| 2004/0134261 A1 | 7/2004 | Pampinella | |
| 2008/0083267 A1 | 4/2008 | Pampinella et al. | |

OTHER PUBLICATIONS

Comparison of Claims in U.S. Appl. No. 10/742,829 to Applicant's Snake-eye Fitting That Admittedly Infringes Prior Art Pat. No. 6,997,041.

Comparison of Claims in U.S. Appl. No. 10/742,829 to the Disclosure of Pat. No. 6,997,041.

Grant E. Kinsel, Attorney for Defendant Inflow Products, Inc., Preliminary Invalidity Contentions Pursuant to the Court's Oct. 30, 2007 Order, United States District Court, Southern District of California, Feb. 11, 2008, 27 pages.

Exhibit II-A, Preliminary Invalidity Contentions, *Securus, Inc.*, v. *Inflow Products, Inc.*, U.S. Patent No. 6,234,007, issued May 22, 2001 to Pampinella ("Pampinella '007"), 6 pages.

Exhibit II-B, Preliminary Invalidity Contentions, *Securus, Inc.*, v. *Inflow Products, Inc.*, U.S. Patent No. 6,422,064, issued Jul. 23, 2002 to Pampinella ("Pampinella '064"), 6 pages.

Exhibit II-C, Preliminary Invalidity Contentions, *Securus, Inc.*, v. *Inflow Products, Inc.*, U.S. Patent No. 6,672,139, issued Jan. 6, 2004 to Pampinella ("Pampinella '139"), 6 pages.

Exhibit II-D, Preliminary Invalidity Contentions, *Securus, Inc.*, v. *Inflow Products, Inc.*, Three-Section Plug, Inflow Products, circa 2001, 6 pages.

* cited by examiner

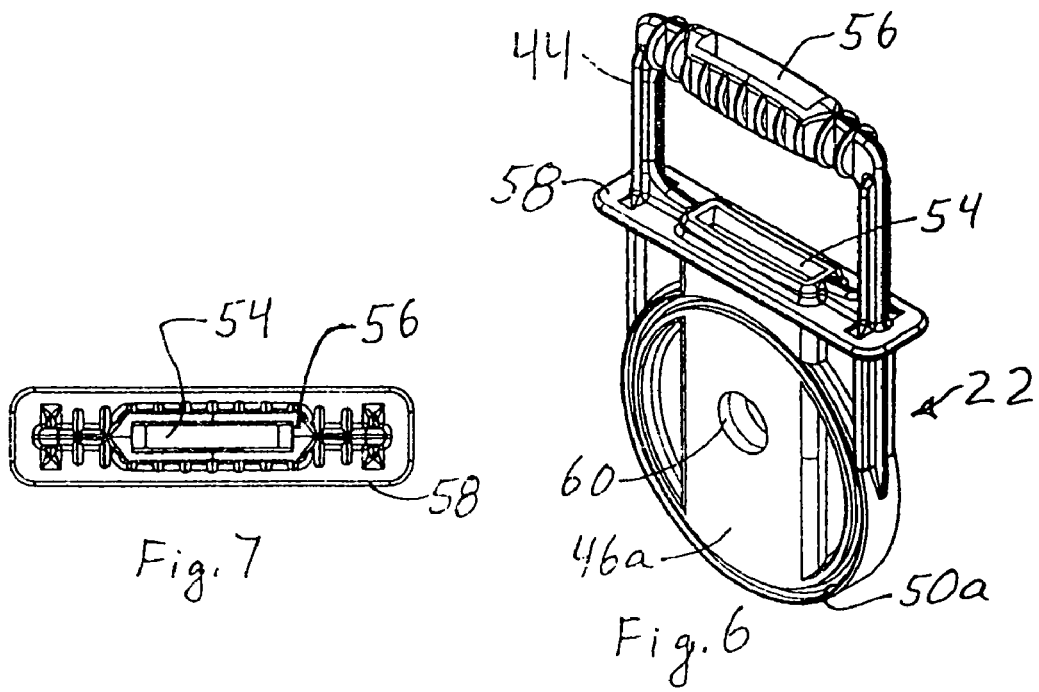
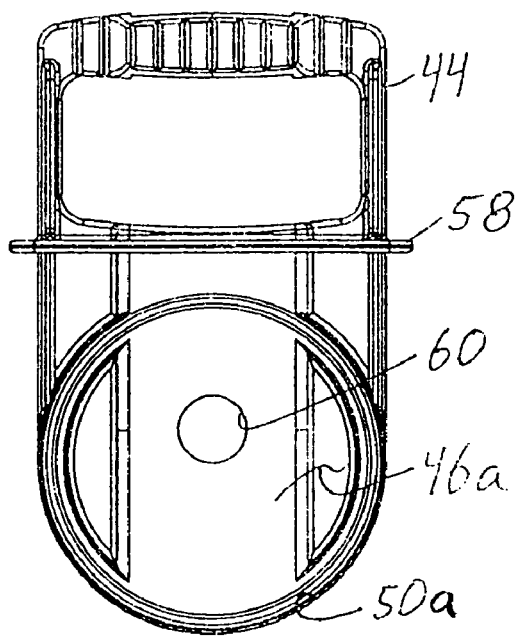
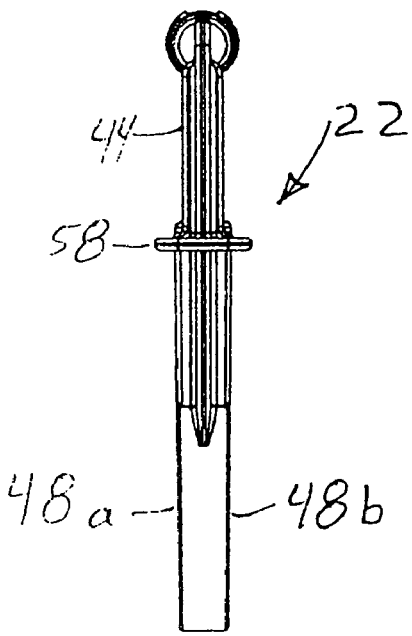

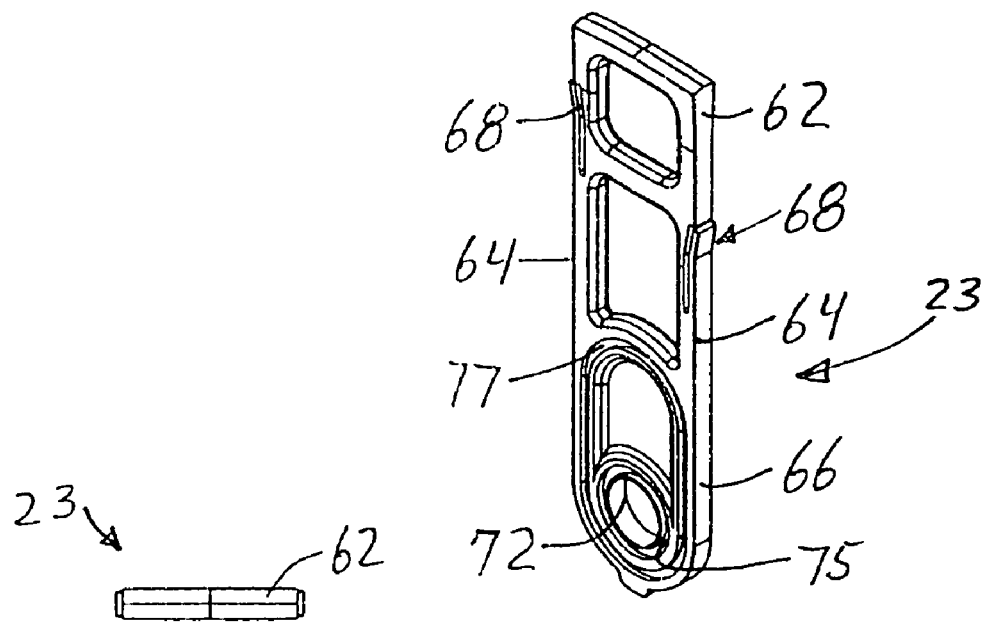
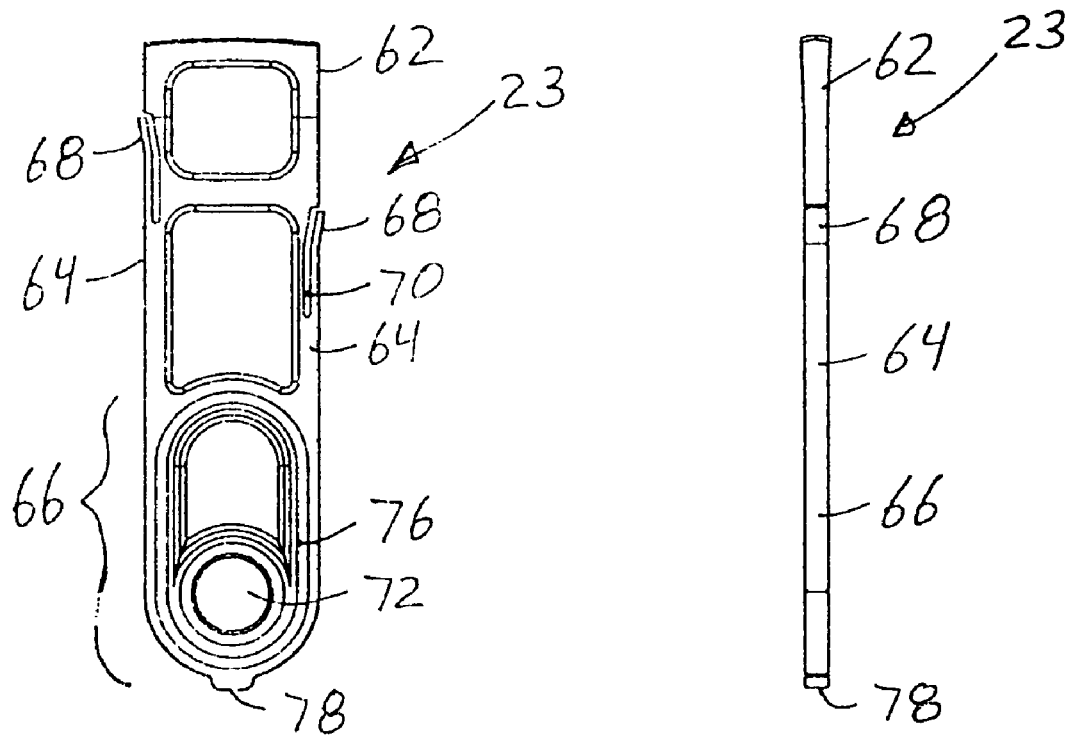

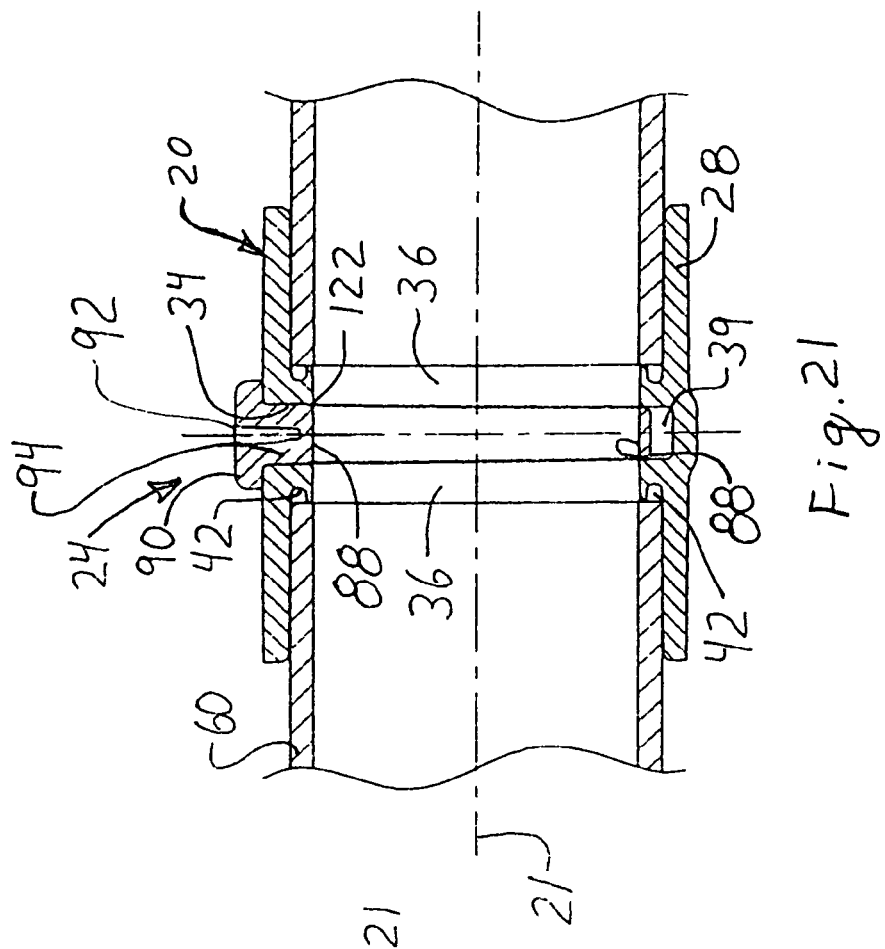
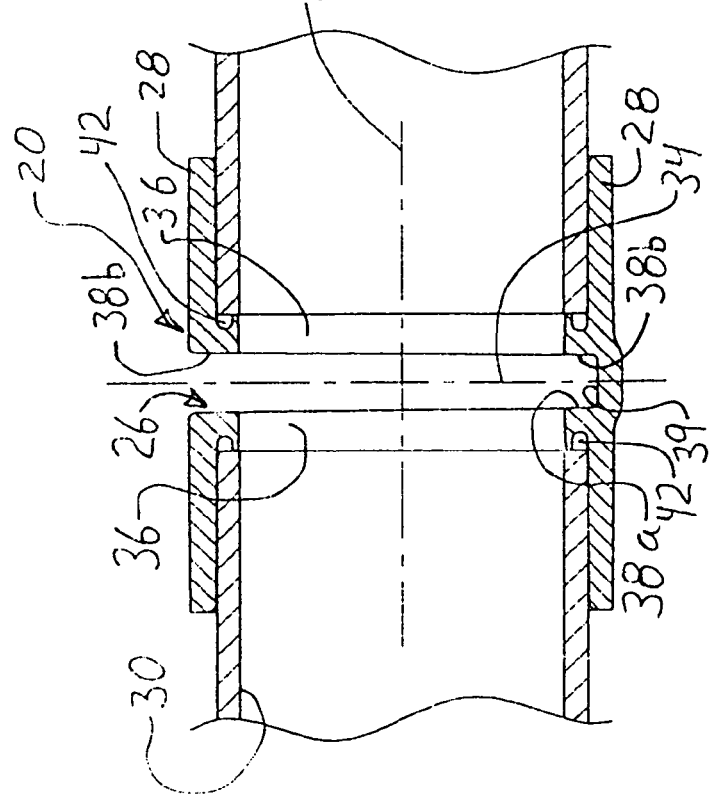

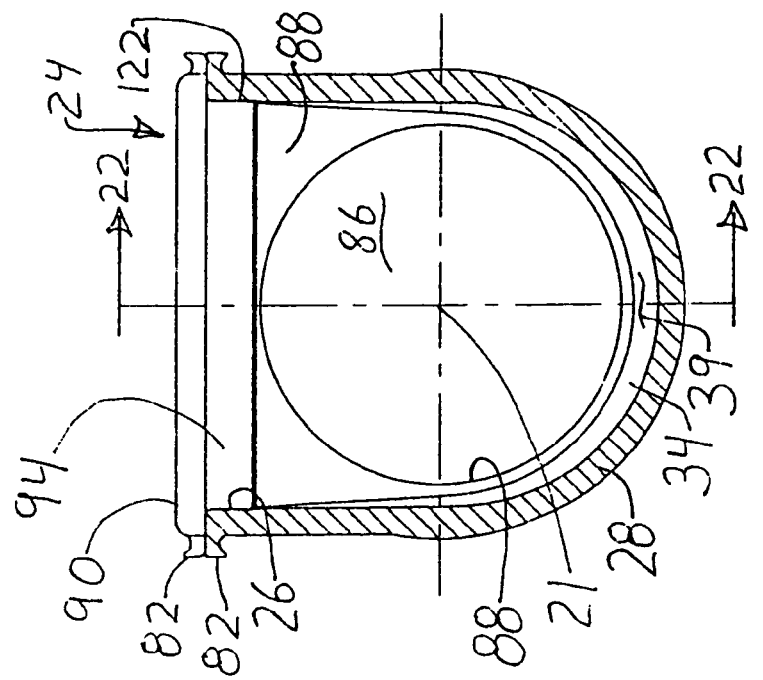
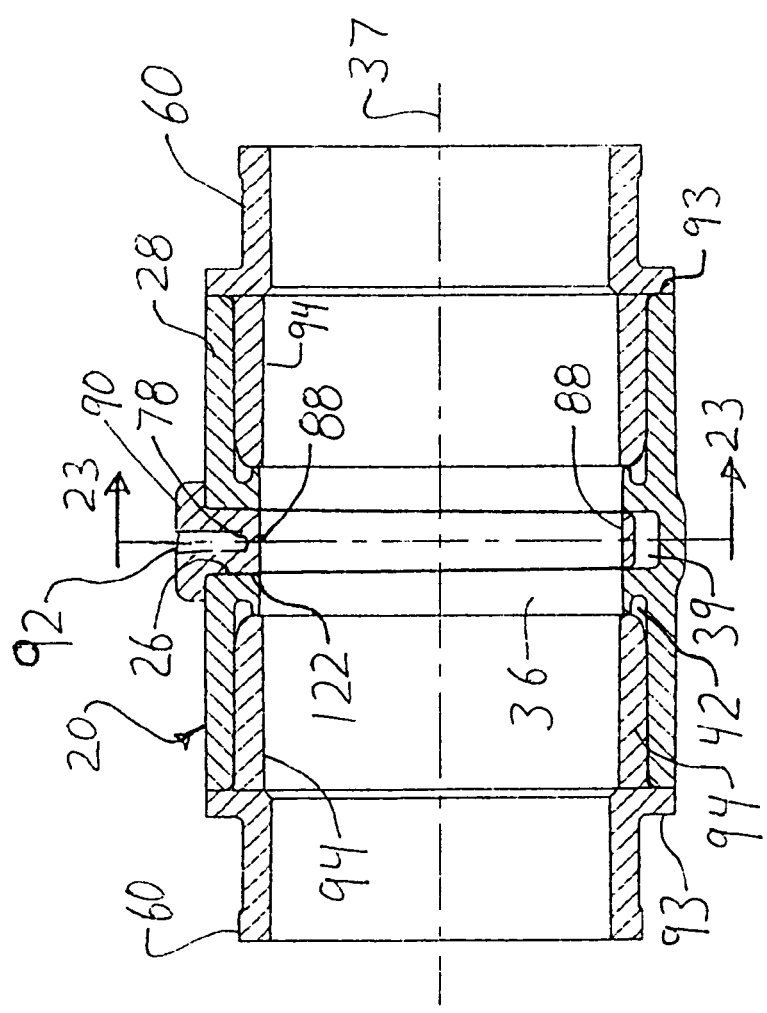
Fig. 23
Fig. 22

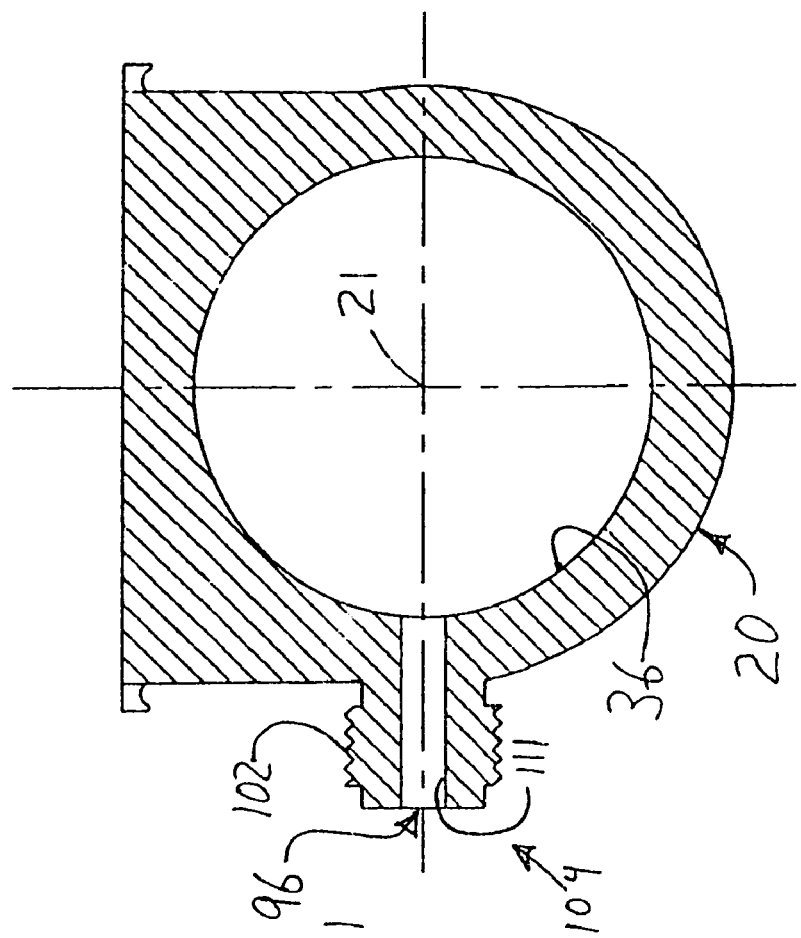
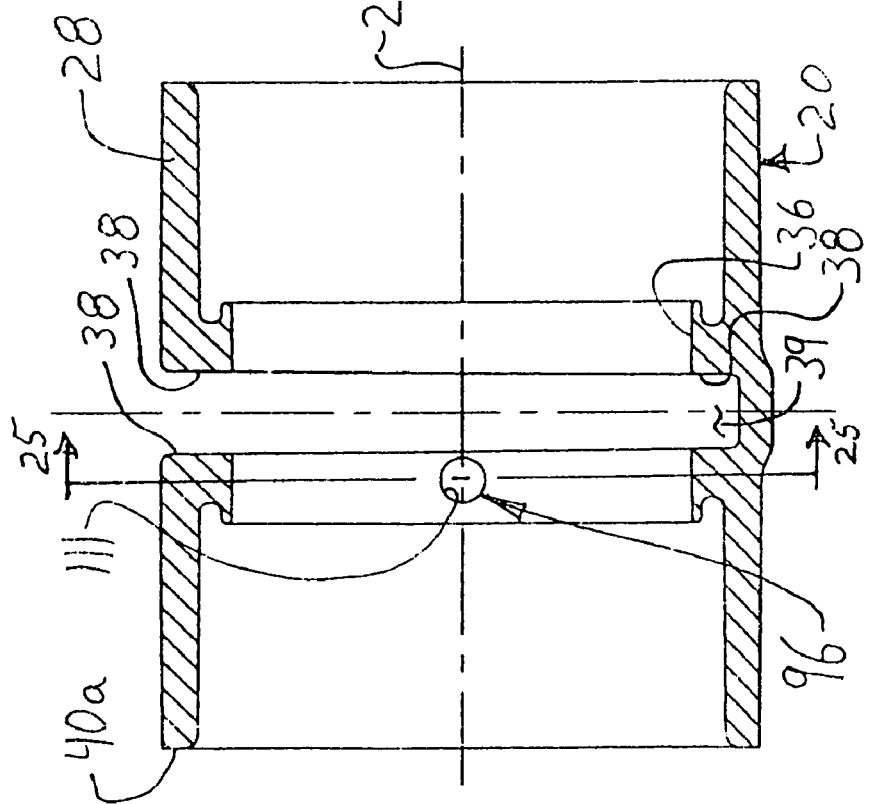
Fig. 25
Fig. 24

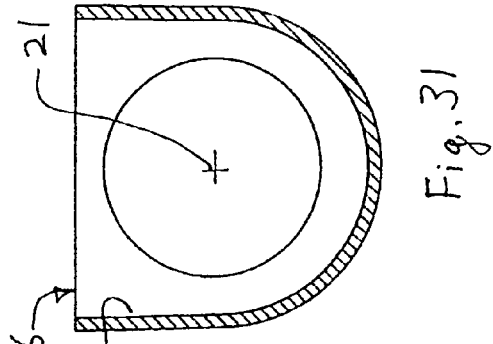
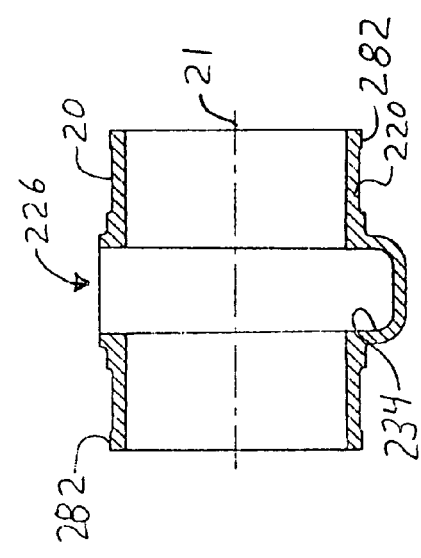
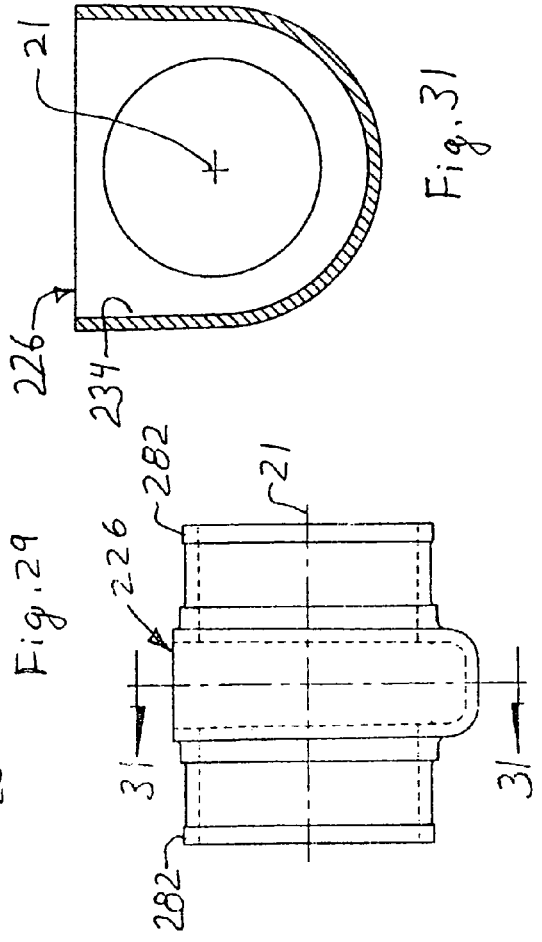
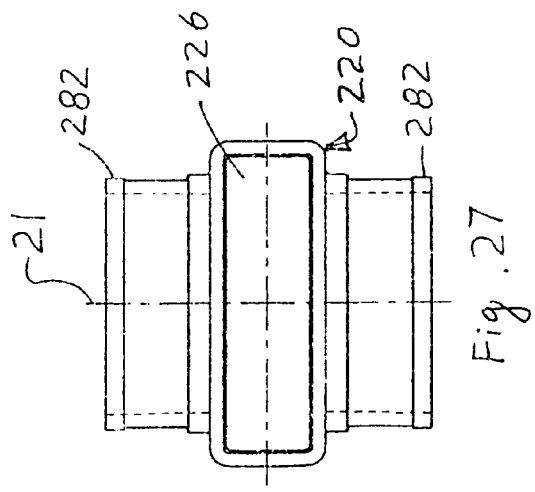
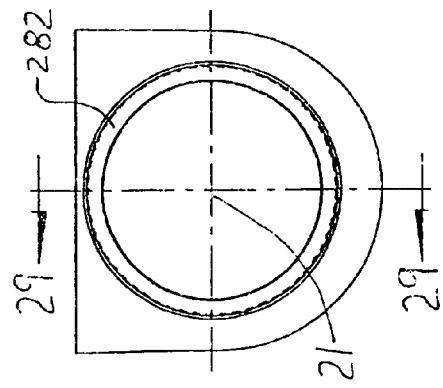

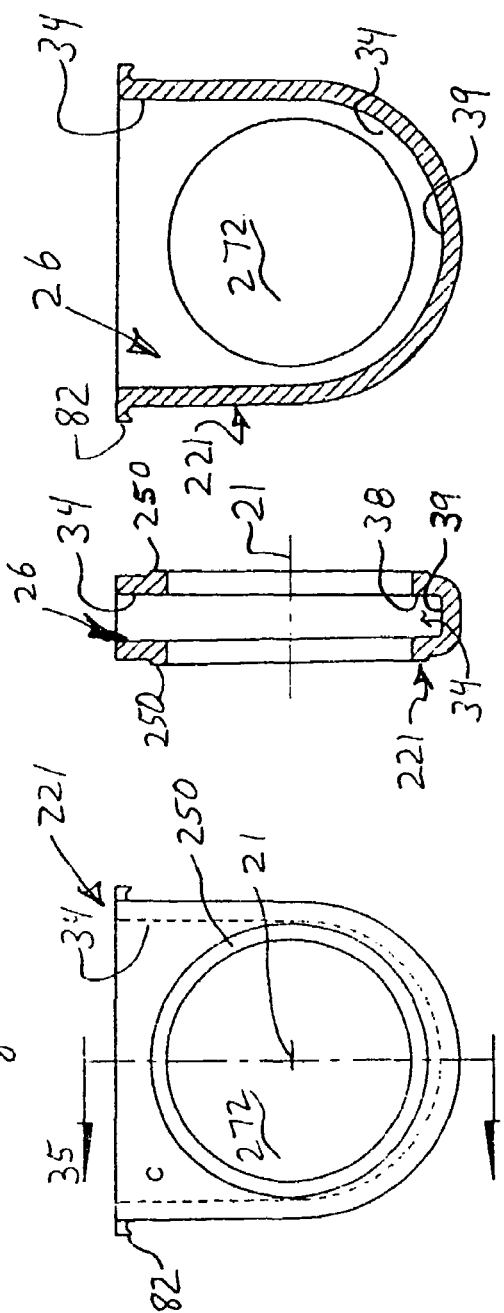

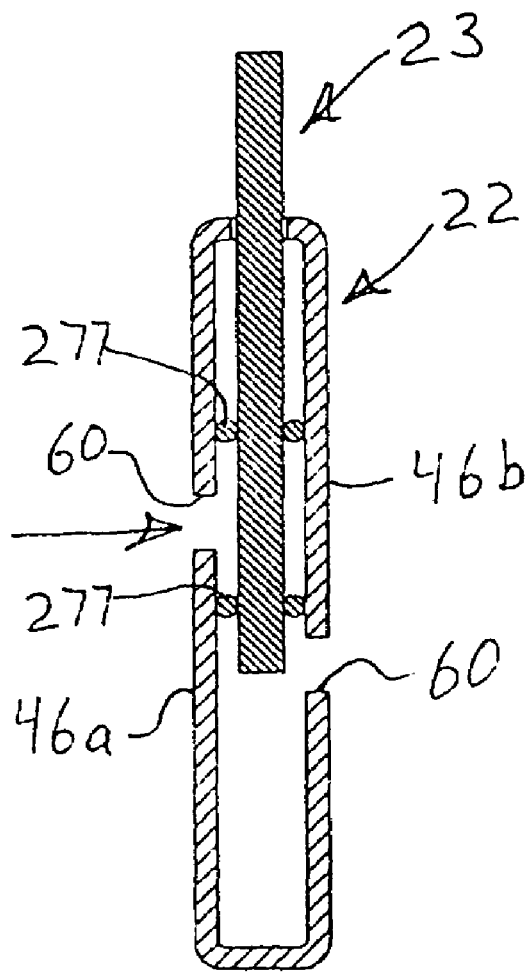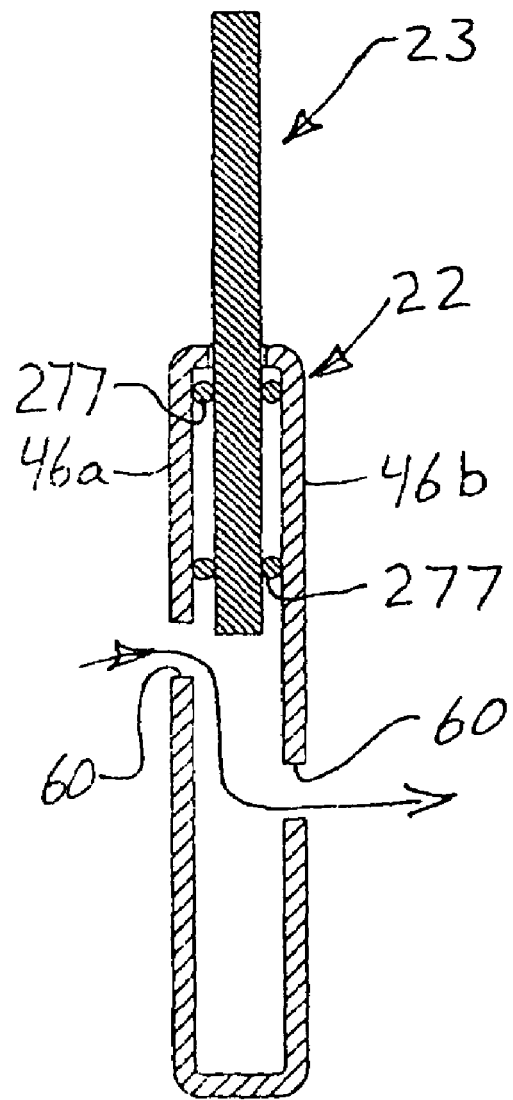
Fig. 37
Fig. 38

DUAL SLIDE GATE VALVE AND METHOD FOR USING SAME

CROSS-REFERENCE TO RELATED APPLICATION

The present application is a Continuation of U.S. patent application Ser. No. 10/353,595 filed Jan. 29, 2003, now U.S. Pat. No. 6,873,178, which is a continuation of application Ser. No. 10/706,578, filed Nov. 12, 2003, now U.S. Pat. No. 6,997,041, which is a Continuation of U.S. patent application Ser. No. 10/620,638, filed Jul. 16, 2003, now abandoned, which claims the benefit of U.S. Provisional Application No. 60/396,525, filed Jul. 17, 2002 and is a continuation-in-part of U.S. patent application Ser. No. 09/832,917, filed Apr. 11, 2001, now U.S. Pat. No. 6,655,413, issued on Dec. 2, 2003, the entirety of the disclosures of which are expressly incorporated herein by reference.

BACKGROUND OF THE INVENTION

Buildings and houses have pipe lines that need to be pressure tested in order to verify that the various joints in the pipe line do not leak. Such lines include water lines and drainage lines. This testing is typically done by hooking up a source of pressurized air or water to the line and filling the line. Because an open line will not hold the pressure for testing, the end(s) of each line must be capped or plugged prior to introducing the pressurized air or water. This is troublesome, and there is thus a need for an easier way to block the line for testing.

Further the line must frequently be tested in an intact state, after all joints have been fully assembled. If a single joint, or a series of joints are tested, this testing requires plugs to be introduced into the interior of the pipe via temporary openings which must be later closed and sealed. The current methods of achieving these temporary seals introduce significant and undesirable complications, including leaks, or spills. Moreover, several methods of temporarily sealing the line involve introducing inflatable balloon-like devices into the pipe via a fitting opening, inflating the balloon inside the line to seal the line for testing, and then removing the balloon and screwing a sealing cap into the opening through which the balloon was inserted. If the balloon is defective or over-inflated it can rupture and explode, with the potential for damage to the line or serious injury to the plumber. There is thus a need for a simpler, easier and safer way to temporarily block plumbing pipes for testing.

Moreover, current methods of introducing the pressurized fluid into the pipeline may require the plumber to do so from a location remote from the test and then return to the point of the test, or it may require two persons to accomplish the filling and testing. There is thus a need for a better way to pressurize and test lines, or portions of lines, by a single person at a single location.

Additionally, when the pressure in a line is relieved after testing, the pressure can cause problems with the obstruction blocking the flow during testing. The test pressure can cause unexpected movement of the obstruction once removal of the test obstruction begins, or it can cause water to squirt out around the obstruction at high pressure, either of which can cause difficulties. There is thus a need to relieve the test pressure in a controlled manner.

SUMMARY

The above and other objectives are achieved by providing a method and apparatus for pressure testing a pipe line wherein a fitting is inserted into the pipeline by attaching ends of the pipeline, or intermediate adapters, to opposing sides of the fitting to define a flow path through the fitting extending along a longitudinal axis. Where it is intended that the fitting is to be attached by inserting pipe ends into the fitting, a female socket is provided for each of the two pipe ends. Preferably, an internal boss is provided that extends around a circumference of the flow path and extends radially inward toward a centerline of the fitting a distance corresponding to the wall thickness of the mating male ends of the pipes so the pipes and boss define a periphery of the flow path through the fitting. A recess is formed in the boss to sequentially receive two slides. The boss is optional, and the recess could be formed in the wall of the fitting. An externally accessible port allows a test slide to be inserted into the recess, with the test slide sealing against the walls defining the recess to form a fluid-tight seal for pressure testing the line.

After testing is completed or when the pressure from test fluid is to be released, a pressure release slide is partially removed to relieve the pressure. The pressure release slide is held in a recess within the test slide, so there is a slide within a slide. Advantageously the pressure is released by aligning a hole in the test slide with a hole in the pressure release slide to allow fluid to flow through the test slide and pressure release slide to relieve pressure. The pressure release slide thus places the fitting on opposing sides of the test slide, in fluid communication to relieve pressure.

The test slide and pressure release slide are removed after completion of the pressure testing, and a finish slide is inserted into the recess, again via the external port. The finish slide has an opening located and configured to coincide with the flow path-through the male ends of the pipes, while the portion of the finish slide surrounding the opening blocks the recess and thus provides a substantially uniform, cylindrical flow path through the fitting. At the same time, the finish slide is configured to seal the external port against leakage.

The parts to achieve the above operations preferably comprise an assemblage of a fitting, test slide, pressure release slide, and finish slide. As the test slide is reusable, a common sub-combination for sale and use is the fitting and finish slide, with the test slide and its pressure release slide being obtained separately and reusable. In more detail, the pressure testing kit for testing the pressure in a pipe line includes a main fitting having at least one end adapted to connect to an end of a pipe and align a fluid passage of the pipe with a fluid passage extending through the main fitting during use of the kit. The main fitting has formed therein a port opening on an exterior side of the fitting. Preferably, but optionally, the port is aligned with a recess extending around at least a portion of an internal circumference of the fluid passage in the main fitting. That helps seal the test slide in the fitting.

The first test slide is preferably, but optionally included I the kit. The test slide is sized and configured to be removably inserted through the port and into the recess to block the flow of fluid through the main fitting. The test slide has a recess therein extending over a portion of the test slide that is positioned within the fluid passage to block the flow when the test slide is inserted into the fitting. The test slide has a first hole through the slide located to be placed in the fluid flow path of the fitting when the test slide is inserted into the fitting.

The test slide contains a second pressure release slide sized and configured to be removably received within the recess in the test slide. The pressure release slide in one configuration has a second hole therein located and positioned so it can overlap with at least a portion of the first hole in the test slide in a first, open position and so it can not overlap with the hole in the test slide in a second, closed position. Fluid seals are interposed between the test slide and the pressure release slide, and while the shape and location will vary with the configuration of the slides, the seals are located to prevent passage of fluid through both the test slide and pressure release slide when the pressure release slide is in the second position.

The finish slide is the third slide in the complete kit, and it is sized and configured to be inserted into the port and recess to seal the port. The finish slide preferably, but optionally, has an opening corresponding in size and shape to the fluid passage through the main fitting to allow flow through the finish slide while providing a smooth flow surface across the finish slide and immediately adjacent portions of the main fitting. The main fitting preferably, but optionally, has a boss extending toward a longitudinal centerline of the fitting, with the recess to receive the test slide being formed in the boss.

While the seal types and locations will vary, the pressure release slide advantageously has a first and second seal interposed between the test slide and the pressure release slide, with the first seal surrounding the second hole and the second seal surrounding the first seal. Advantageously, the second seal has an elongated shape that allows the first and second slides to move relative to each other while maintaining a sealed area between the first and second slides within the second seal.

Advantageously, but optionally, the pressure testing kit includes at least one releasable locking mechanism interposed between the first and second slides to releasably restrict relative motion of the first and second slides. There is thus provided means for locking the pressure release slide in an open or closed position relative to the test slide.

In another aspect, there is provided an assembly for testing the pressure in a pipe line using a fitting as generally described above and a test slide as generally described above. Additionally, the second pressure release slide is sized and configured to move within the recess between a first position blocking the flow of fluid through the first hole in the test slide, and a second position allowing fluid to flow through the test slide. The second slide has fluid seals interposed between the second slide and the recess to block the fluid flow in the first position and allow the fluid flow through the test slide in the second position.

The fluid seals on the second slide are preferable, but optionally, face seals, although axial seals can also be used. In one embodiment, the second slide has a cylindrical shape and the seals are axial seals located generally parallel to the flow path.

Advantageously, the first test slide has a second port opening on an exterior side of the fitting and aligned with the recess and the second slide is removably inserted through the second port and into the second recess. The second slide can advantageously have a rectangular cross-sectional shape and if so the fluid seals can advantageously comprise face seals.

In the preferred configuration, the second slide has a second hole therein with the first and second holes overlapping to allow fluid flow through the test slide in the open position. The second slide has a second position in which the first and second holes do not overlap and the seals block fluid flow through the test slide.

The fluid seals can comprise a first seal interposed between the first and second slides and surrounding the second hole to provide a fluid seal between the first and second slides around the second hole. The fluid seals can further comprise a first seal interposed between the first and second slides on opposing sides of the second slide and surrounding the second hole to provide a fluid seal between the first and second slides around the second hole. Advantageously, the fluid seals further comprise a second seal interposed between the first and second slides and surrounding the first seal. Moreover, the fluid seals preferably have a second seal interposed between the first and second slides on opposing sides of the second slide and surrounding the first seal. In one preferred configuration, the second seal has two sides that are substantially parallel.

There is thus provided first means for sealing the internal periphery of the fitting defining the fluid flow path for fluid passage through the fitting, and means for blocking fluid flow through the fluid passage during use of the fitting. There is also provided second means for allowing fluid flow through the first means when in an open position and for blocking fluid flow through the first means in a closed position.

The fitting can be made of different material than the test slide and pressure release slide, and in such cases it is advantageous to have the walls defining the fluid passage in the fitting formed in part by a non-metallic insert placed into an externally accessible recess in the pipe. The first means can cooperate with the insert to block flow through the fluid passage. The first means advantageously comprises the test slide having a hole therethrough. The second means advantageously comprises a slide moving within a recess in the first means or test slide, and the slide can either have a hole through which fluid flows when in the open position, or the movement of the slide can unblock the flow through the test slide.

The above apparatus can further comprise an externally accessible fill port in fluid communication with the fluid passage through the fitting in order to pressurize the line or to introduce fluid into the line.

There is also provided a method for pressure testing a pipe line having a fitting in fluid communication with the line in which the fitting has an externally accessible port. The method comprises placing a first slide into the fitting through the port to block fluid flow through the fitting and out the port. The first test slide has an internal recess with a first hole extending through the test slide and recess to allow fluid flow through the first test slide. The method further comprises placing a second slide in the internal recess in a closed position to block fluid flow through the first slide and providing a fluid seal between the first and second slides to prevent fluid flow through the first slide. The line is then filled with fluid to pressure test the line. The test pressure is released by moving the second slide to unblock the fluid flow through the first slide.

Preferably, the second slide blocks flow through the first hole, but alternatively the second slide can block flow out of the recess. Advantageously, the second slide has a second hole that is aligned with the first hole to allow fluid to flow through the first slide, and includes the further step of providing a fluid seal surrounding the aligned first and second holes. Further, the filling step can further comprise connecting a fluid source to an externally accessible port on the fitting that is in fluid communication with the portion of the line to be tested.

In a further embodiment, the externally accessible port is formed by placing a non-metallic insert into a metallic fitting to provide a fluid tight seal between the fitting and the insert. The insert is provided with a recess therein that cooperates with the first slide to provide a fluid tight seal between the insert and the first slide.

After the testing, the method preferably includes removing the first and second slides, and sealing the port by inserting a finish slide into the port. Preferably, but optionally, the fitting has walls defining a recess that cooperates with the first slide to block fluid flow through the fitting, and the finish slide has walls cooperating with that recess to provide a substantially smooth fluid flow path through the fitting at the location of the walls of the finish slide.

The method also includes the steps of connecting at least one end of a pipe fitting having a fluid passage there through to a pipe line to define a fluid flow path along a longitudinal axis, and providing the fitting with an externally accessible port. A first slide having opposing faces is inserted through the port into the fitting to engage a sealing surface on at least one face of the slide with a surface in the fluid passage. The slide is sized and configured and the sealing surfaces are located to block the fluid passage sufficiently to allow pressure testing of the pipe line. The first slide has an internal recess therein and has a first hole extending through the slide and internal recess with a second slide located within the internal and having seals cooperating with the first slide to block fluid flow through the first hole and first slide. The pipe line is then pressure tested. The method then moves the second slide within the recess so that a second hole in the second slide overlaps with at least a portion of the first hole to allow fluid to flow between the first and second holes to relieve the test pressure in the line. The first slide is then removed. A third slide is then inserted through the port into the fitting and sealing the port with the third slide. The third slide is configured so it does not block flow through the fluid passage of the fitting.

In this method the fitting advantageously has a recess extending about at least a portion of a circumference of the flow path, and the first slide preferably extends into the recess around the entire circumference to block the flow path. Further, the third slide advantageously has an opening therein defined by walls, with the opening being sized and located to cooperate with the recess in the fitting to block that recess and form a portion of the fluid passage when the third slide seals the port. Moreover, the method can optionally include permanently fastening the third slide to the port to prevent fluid passage through the port. The permanent sealing can include placing adhesive on the third slide, the finish slide, and adhering the port and at least a portion of the recess to the third slide. Moreover, the first slide can be made of a material different from the fitting and selected so the adhesive does not adhere to the first slide. The third slide is advantageously made of a material selected to be adhered to the fitting.

The method can further include the optional steps of providing a fluid passage extending from outside to the inside of the fitting. In such cases, the fluid passage preferably has a first end accessible externally of the fitting and has a second end in fluid communication with the fluid passage of the fitting so that fluid can be introduced from an external source into the fluid passage inside the fitting. Preferably the fluid passage extends through a wall of the fitting, but optionally it could extend through the test slide The method optionally, but advantageously, further comprises providing the fitting with an internal boss around at least a portion of a circumference of the fluid passage so the boss extends radially inward toward the longitudinal axis and forms a recess in the boss. The fitting is advantageously connected to the pipe line by providing opposing ends of the fitting with female ends and inserting mating male ends of the pipeline into the female ends so the male ends abut the boss, the boss and male ends providing a substantially uniform diameter to the fluid passage through the fitting.

The method preferably uses one of the first or test slides described herein, and also preferably uses one of the pressure release slides described herein. Such test slides are inserted into a port of a test fitting to block the fluid flow through the test fitting, the line is pressure tested, and the pressure is released by moving the second slide to allow fluid flow through the test slide. Preferably, the second slide has a hole therein that is aligned with the first hole in the test slide in order to release the pressure, and still more preferably the second hole is surrounded by a first face seal. The first face seal is further surrounded by a second face seal.

BRIEF DESCRIPTION OF THE DRAWINGS

These as well as other features of the present invention will become more apparent upon reference to the following detailed description and drawings in which like numbers refer to like parts throughout, and in which:

FIG. 6 is a perspective of a test slide as shown in FIG. 1 but without a pressure release slide;

FIG. 7 is a top plan view of the test slide of FIG. 6,

FIG. 8 is a plan view of the test slide of FIG. 6 taken along the flow path through the fitting of FIG. 1, with the opposing view being a mirror image thereof;

FIG. 9 shows a plan, side view of the fitting and test slide of FIG. 9, with the opposing side being a mirror image thereof;

FIG. 10 is a perspective view of the pressure release slide of FIG. 1;

FIG. 11 shows an top view of the pressure release slide of FIG. 10;

FIG. 12 shows a plan view of the pressure release slide of FIG. 10 taken along the flow path through the fitting of FIG. 1, with the opposing view being a mirror image thereof;

FIG. 13 shows a plan, side view of the pressure release slide of FIG. 10, with the opposing view being a mirror image thereof;

FIG. 20 is a section view of the fitting of FIG. 1 connected to pipes and is taken along section 20-20 of FIG. 2;

FIG. 21 is a section view of the fitting of FIG. 20 with a finish slide inserted in the fitting;

FIG. 22 is a section view of a fitting of FIG. 1 that has end flanges with a test slide inserted in the fitting and is taken along the section 22-22 of FIG. 23;

FIG. 23 is a section view of the fitting of FIG. 22, taken along section 23-23 of FIG. 22;

FIG. 24 is a section view of a further embodiment of the fitting of FIG. 1 having a fluid fill port therein;

FIG. 25 is a section view of the fitting of FIG. 25 taken along section 25-25 of FIG. 24;

FIG. 27 is a top plan view of a further embodiment of the fitting of FIG. 1;

FIG. 28 is an end view of the fitting of FIG. 27;

FIG. 29 is a sectional view taken along section 29-29 of FIG. 28;

FIG. 30 is a side view of the fitting of FIG. 27 with the opposing side view being a mirror image thereof;

FIG. 31 is a sectional view taken along section 31-31 of FIG. 30;

FIG. 32 is an edge end view of an insert for the fitting of FIG. 26 with the opposing edge view being a mirror image thereof;

FIG. 33 is a top view of the insert of FIG. 32;

FIG. 34 is a side view of the insert of FIG. 23 taken along flow line 21 with the opposing side view being a mirror image thereof;

FIG. 35 is a sectional view taken along section 35-35 of FIG. 34;

FIG. 36 is a sectional view taken along section 36-36 of FIG. 34;

FIG. 37 is a sectional view of a further embodiment of a test slide and pressure release slide of the type used in FIG. 1 but in a closed position; and FIG. 38 is a sectional view of a further embodiment of a test slide and pressure release slide of the type used in FIG. 1 but in a closed position.

DETAILED DESCRIPTION OF THE PREFERRED EMBODIMENT

Figure 1:
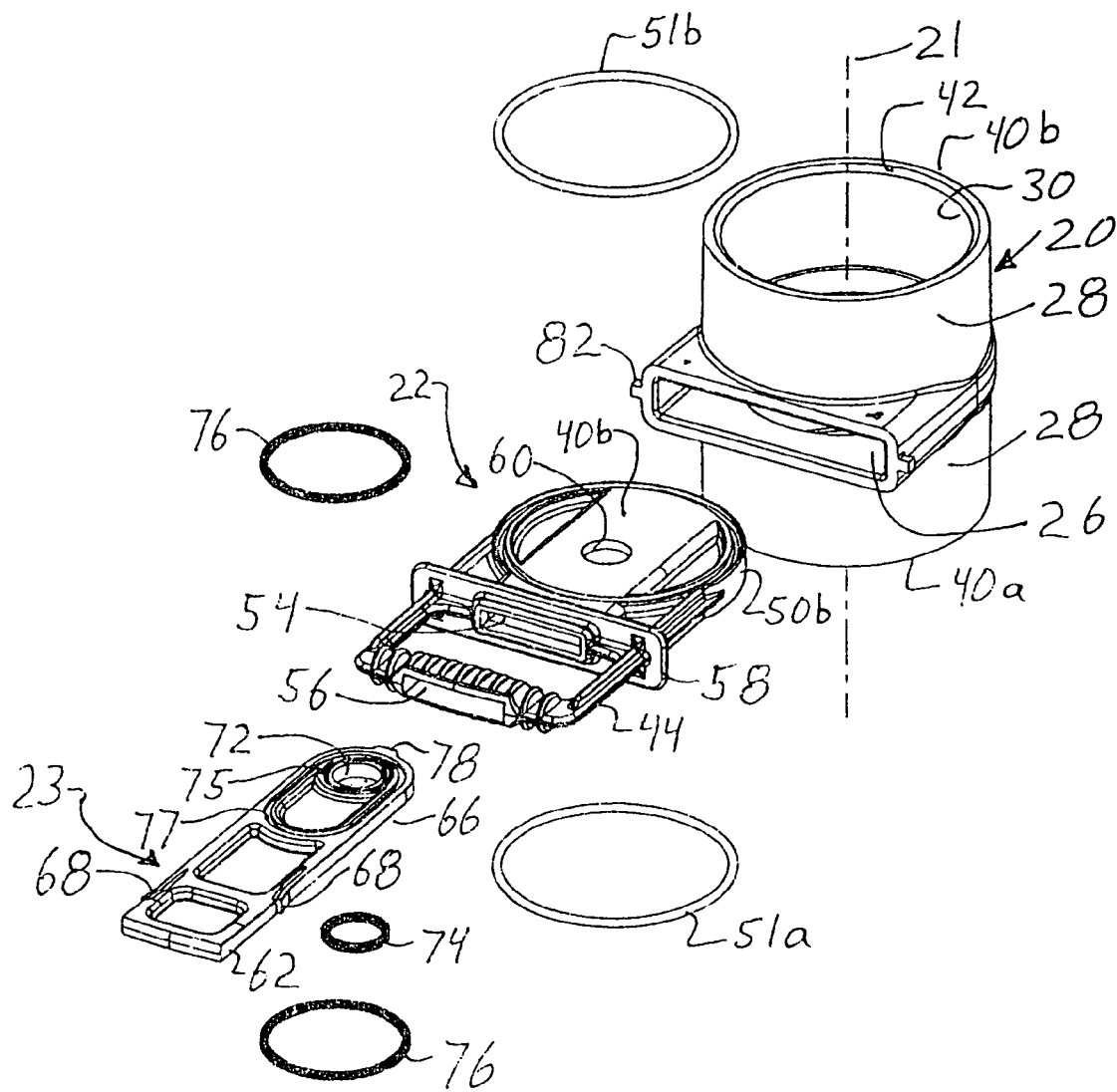
FIG. 1 shows an exploded view of a fitting, test slide and pressure release slide.

Referring to FIGS. 1-5, 7 and 20, a main fitting 20 is provided for insertion into a pipe line, such as the water line of a house or building, or a sewage drain system, so as to allow fluid to flow through the fitting 20 and the line. The fitting 20 is shown as a straight fitting with a longitudinal axis 21 therethrough along the center of the flow path through the fitting, but the fitting could be of various shapes and types, including a Y-fitting, a clean out fitting, an elbow fitting, a reducing fitting, a narrowing fitting or an enlarging fitting.

A first slide, referred to here as a test slide 22, can be removably inserted into the fitting 20 to provide a fluid tight seal with mating surfaces of the fitting 20 to allow pressure testing of the drain system upstream of the test slide 22. After testing is completed, but before removal of the test slide 22, a second slide, referred to as a pressure release slide 23, can be used to release pressure in the line. The pressure release slide 23 is received within the test slide 22 so there is a slide-within-a-slide. After testing is completed, the test slide 22 is removed and a second slide, referred to here as finish slide 24 (FIG. 21), is then inserted into the fitting 20 and secured to the fitting in order to prevent fluid from escaping the fitting 20.

The fitting 20 has an opening or port 26 configured to sealingly receive test slide 22. The port 26 can have various shapes, but is shown with a rectangular opening or port 26 that extends through a wall 28 of the main fitting 20. The wall 28 has an exterior side 32 and an interior side 30 that are generally parallel and typically form a tube. The port 26 can be at various locations and orientations on the fitting 20, but is described here as being located on the top side of the fitting. The top refers to the upward direction that is away from the ground and opposing gravity while the bottom or downward direction refers to a direction toward the ground and along the direction of gravity.

Referring to FIGS. 1-5 and 20, the port 26 opens into a recess 34 that extends around an inner circumference of the interior wall 30. The recess 34 is preferably formed partially in wall 28 and partially in an optional boss 36 extending radially inward from the interior walls 30 toward centerline 21. The recess 34 could be formed entirely in either part, and the boss could be omitted. The recess 34 can have various shapes, but preferably has a rectangular cross-sectional shape with opposing and generally parallel walls 38a, 38b (FIG. 20). The recess forms a groove in the inside walls of the fitting 20 extending away from the longitudinal axis 21, but opening toward the axis 21. When viewed along the longitudinal axis 21, the juncture of the recess 34 and the port 26 can be thought of as a circular recess 34 encircling the flow path, joined to a port 26 having a rectangular shape with a semi-circular cut-out at the location of the flow path and recess. When viewed along the path followed by the slides 22, 24 when they are inserted and removed, the rectangular-cross-sectioned port 26 has its smaller edges extending straight to a plane through the longitudinal axis 21 which plane is perpendicular to the path that the slides 22, 24, 23 travel.

The recess 34 can be centered about centerline 21, but is preferably offset slightly in a direction away from port 26 so that it extends slightly further into the wall 28 opposite the port in order to form a crescent shaped trap 39 (FIG. 20) to allow debris to collect in that portion of the recess. The trap 39 is formed by the space between the periphery of the test slide 22 and a radially outward wall defining the recess 34. Various shapes can be used for the trap 39, but offsetting the recess 34 from the centerline of the fitting 20 allows easy manufacture while providing a trap 39. The trap 39 is greater in size than any tolerances formed by manufacturing tolerances, mis-alignment tolerances and mis-fit tolerances. Advantageously it is about 1/32 of an inch or more greater than the accumulated tolerances mentioned above.

If the intended orientation of the fitting 20 during use does not have the port 26 vertically upward, then the location of the trap 39 can in some instances be changed so that it is in the lower portion of the fitting 20 to allow gravity to urge debris into the trap 39. If the port 26 is located downward, then the trap 39 can be omitted. If the longitudinal axis of fitting 20 is vertical, then the trap location may not matter much. While the trap 39 can be omitted entirely even with the port 26 located vertically, it is preferably included in order to ensure the slides 22, 24 fit into the recess 34.

The fitting 20 has opposing ends 40a, 40b. Preferably, but optionally, the opposing sides of the fitting adjacent to ends 40a, 40b each has a recess 42 (FIG. 20) to receive adhesive, as discussed later.

The test slide 22 is inserted into the port 26 to block the fluid flow through the passageway of the fitting 20 along flow path centerline 21. The test slide provides a seal in the fitting 20 sufficient to permit pressure testing of the plumbing line. Pressure testing requirements can vary in terms of pressure, time and fluid used for testing. The test slide 22 has an exterior end forming a handle 44 adapted to be grasped by a tool or hand to insert the slide 22 into and pull it out of port 26. FIGS. 1, 6, 14 and 17 show one example of a handle configured to allow fingers to be inserted through the handle and gripped to move the test slide 22. The handle can extend laterally from the front, back, or sides of the test slide 22. Preferably, but optionally, the handle 44 extends in the same plane as the slide body 46 and is sized to allow a person's fingers to fit within the handle to withdraw it from the fitting 20.

To relieve the test pressure after testing, the pressure release slide 23 is used. Referring to FIGS. 1, and 7-9, the test slide 22 has a slide body 46 configured to block the flow passage through fitting 20, preferably so that no fluid passes the slide 22, and at least sufficient to allow pressure testing of the pipe line. Advantageously, the test slide 22 is of a different color than the fitting 20 in order to indicate that the test slide is in use. The test slide body 46 has opposing and generally parallel side walls or faces 48a, 48b (FIG. 9). For ease of reference, the upstream side of the slide 22 will be referred to as side 48a, and the downstream side during testing will be side 48b.

The slide body 46 has seals located and configured to provide a fluid tight seal with fitting 20, preferably through cooperative sealing surfaces located in recess 34. Various seal types, locations and configurations can be used to achieve the sealing requirements. Preferably the seals prevent all leakage, although the testing requirements may vary and occasionally allow some small amount of leakage. Test pressures of about 0-5 psi are common for testing household plumbing applications, with pressures of 13 psi (about 30 foot head pressure) being used by some regulatory agencies. Advantageously the combination of the fitting 20, the test slide 22 and the pressure release slide 23 is designed to sustain higher internal fluid pressures, and can accommodate pressures of 23 psi minimum for at least 15 minutes, or whatever other pressures and times are appropriate for testing.

Referring to FIGS. 1, 6, 8 and 16 resilient, circular sealing surfaces 50a, 50b are advantageously provided on each of seal faces 48a, 48b. The sealing surfaces 50 can be formed integrally with the test slide 22, and molded simultaneously with the formation of the slide 22. When the test slide 22 is inserted completely into the fitting 20, the sealing surfaces 50 abut opposing side walls 38a, 38b (FIG. 20) of recess 34 to form a circular seal around the entire circumference of fitting 20. This prevents fluid from leaking past the test slide 22 when the slide is fully inserted into the recess 34.

Preferably, the sealing surfaces 50 comprise discrete O-ring seals 51a, 51b, seated in recesses formed in the slide faces 46a, 46b, or alternatively, formed in the walls 38a, 38b of the recess 34. FIGS. 1, 6 and 8 show recesses in the slide faces to receive the O-ring seals 51. O-ring seals are described, but D-ring seals could also be used, as could rings with square cross-sections or sealing rings having other cross-sectional configurations.

There are preferably two, opposing sealing surfaces 50a, 50b, located on opposing sides of slide 22. That allows the test slide 22 to be bi-laterally symmetric so that it can be inserted into the port 24 in either orientation and still seal well. If only one sealing surface 50 is used, the sealing surface is preferably on the upstream side of the slide body 46. The water pressure from the upstream side can sometimes compress a resilient seal on the downstream side sufficiently to cause leakage on the upstream seal 51a, so by placing a stiffer seal on the downstream side, or by omitting the downstream seal 51b entirely but providing abutting sealing surfaces, a substantially watertight seal can be maintained by the upstream side of the slide seal. The sealing surfaces 50 could optionally be formed on the walls 38a, 38b of recess 34 in boss 36.

The opposing walls 38 and the opposing faces 46 were previously described as being generally parallel. The walls 38 and/or the faces 46 can be slightly tapered so that the insertion of the test slide 22 wedges the slide body 46 into the recess 34 to form a seal around the circumference of the fitting 20. Alternatively, the planes containing sealing surfaces 50 could be tapered to accomplish the same sealing result. This wedging effect to increase the sealing force is preferably used with sealing surfaces 50, but could be used without the presence of surfaces 50.

The circumferential sealing surface 50 prevents leakage around the circumference of the fitting 20 when the test slide 22 is completely inserted into the fitting 20 and engages the entire periphery of recess 34.

The slide body 46 contains recess 54 that contains pressure release slide 23, and preferably, but optionally, removably receives pressure release slide 23. The handle and recess can take various forms that allow the pressure release slide 23 to be inserted with the test slide 22, or after the test slide 22 is inserted into fitting 20. Preferably, the handle 44 has an opening 56 aligned with the recess 54 so the pressure release slide can pass through the opening 56 and into the recess 54. The recess 54 and opening 44 are preferably shaped to correspond to the cross-sectional shape of the pressure release slide 23, and are shown in the figures as having a generally rectangular shape. As best seen in FIGS. 8, and 14-19, the hole 60 is not centered in the tubular passageway of the fitting 20. The hole 60 is slightly above the center of the fluid passageway.

The test slide 22 has a flange 58 extending laterally from the test slide at the juncture of the handle 44 and the valve body 46. During use the flange 58 abuts the edges of the fitting 20 that form recess 26 into which the test slide 22 is inserted in order to limit the insertion of the test slide into the recess and fitting. This helps position the test slide 22 with respect to the flow path along axis 21 through the fitting and it helps to position the pressure release slide with respect to that flow path.

The slide body 46 has a pressure release hole 60 extending therethrough along axis 21 (FIG. 1). The hole 60 is located on the slide body 46 so that it is within the fluid passageway formed by walls 28 of the fitting 20. The hole 60 is also located so that it extends through walls or sides 48 of the slide body 46 forming the recess 54 that receives the pressure release slide 23. Referring to FIGS. 1 and 10-13, the pressure release slide 23 is shown. A handle 62 is provided to allow a person to grip the slide to insert and remove it from the recess 56 (FIG. 1) in test slide 22. The handle can take many forms, but is illustrated as rectangular opening in the otherwise generally planar pressure release slide 23. Two legs 64 extend between the handle 62 and a slide body 66.

Preferably, but optionally, at least one of the sides of the slide 23 has a releasable lock 68 to lock the pressure release slide 23 in position relative to the test slide 22. The releasable lock 68 can take various forms which provide releasable fastening of the pressure release slide 23 relative to the test slide 22, including various resilient members resiliently urged to engage and restrain the engaged parts, including detent mechanisms. The lock will be described with reference to a latch 68 that preferably, but optionally, takes the form of a leaf spring formed by a slot 70 (FIG. 12) cut along the length of one leg 64 so the latch 68 has one end integrally formed with or attached to the slide 23, and a free distal end that is resiliently urged away from the slide 23. The distal end is advantageously bent or formed to extend slightly away from the body or leg 64 of the pressure release slide. A latch 68 is shown formed on one side of the handle 62 and another on one leg 64.

Referring to FIGS. 14-19, the distal end of the latch 68 can engage a part of the test slide 22 in order to restrain motion of the pressure release slide 23. The figures show the distal end of outwardly urged resilient latch 68 engaging an edge of the handle 44 on the test slide 22, adjacent the slot or recess 56 through which the slide 23 passes during use. By locating the releasable locks 68 on opposing sides of the pressure release slide 23 are at different positions along the length of the test slide 23, each latch 68 can position the slide 23 at a different position relative to test slide 22. There is thus provided means for locking the pressure release slide 23 in an open position relative to the first means, and means for locking the pressure release slide 23 in a closed position relative to the test slide 22.

Referring again to FIGS. 1 and 10-13, the slide body 66 of the pressure release slide 23 defines a hole 72 that extends through the pressure release slide along an axis parallel to axis 21 (FIG. 1). The slide body 66 is configured to fit within the recesses 56, 54 and to form a fluid tight seal within the recess 54 in the test slide 22. When moved into a first position the slide 23 blocks flow through the test slide 22, and when moved to a second position the slide 23 allows fluid flow through the test body. Fluid seals are provided to prevent fluid flow through the test slide in the closed position, and to prevent fluid leakage out the test slide 22 in the open position. The slide body 66 is sufficiently strong to block the flow of fluid except through opening 72.

Figure 16:
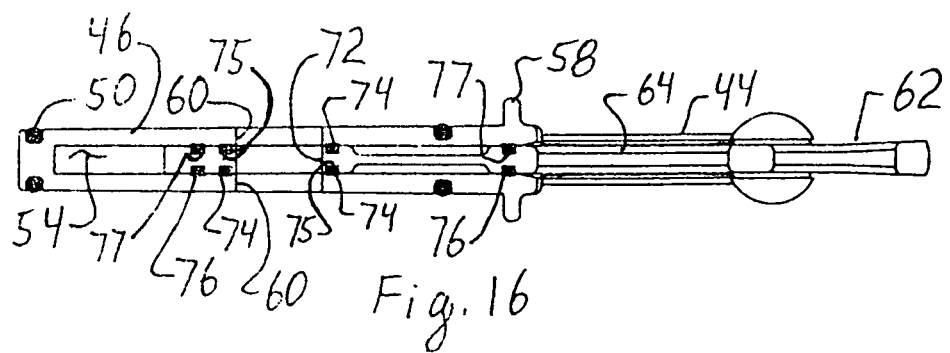
FIG. 16 is a section view taken along line 16-16 of FIG. 15.
Figure 19:
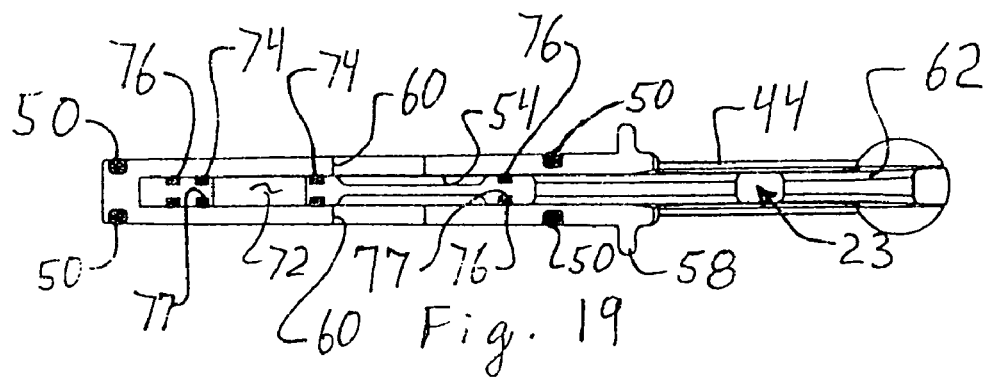
FIG. 19 is a section view taken along line 18-18 of FIG. 17.

Various seals can be used. Preferably, a face seal is used in which the seal is in the plane of the slides 22, 23, and generally orthogonal to the flow path along axis 21. Thus, advantageously a first or small O-ring 74 encircles the opening 72 in a groove or recess 75 around the opening 72 in order to provide a fluid tight seal with the walls 46 of the test slide 22. As seen in FIGS. 1, 16 and 19, there is an O-ring 74 (and groove 75) on each side of the slide 23. The O-rings 74 engage walls 46 of the test slide 22 to provide a fluid tight seal when the O-ring 74 completely engages the walls of the test slide.

A second, O-ring 76 encircles the first O-ring 74 and fits within a recess, preferably a groove 77 around the periphery of the slide body 66. The groove 77, and hence the O-ring are oval-shaped, like a racetrack that extends along generally straight sides of the slide 23. The ends of the groove 77 are rounded. The length of straight section of the O-ring seal 76 is sufficient to allow the pressure release slide 23 to be moved between the two positions (open & closed) reflected in FIGS. 14-19. As these fluid seals 74, 76 are on the slide body 46, they form face seals and are interposed between the pressure release slide 23 and the walls of the recess within the test slide 22.

Figure 17:
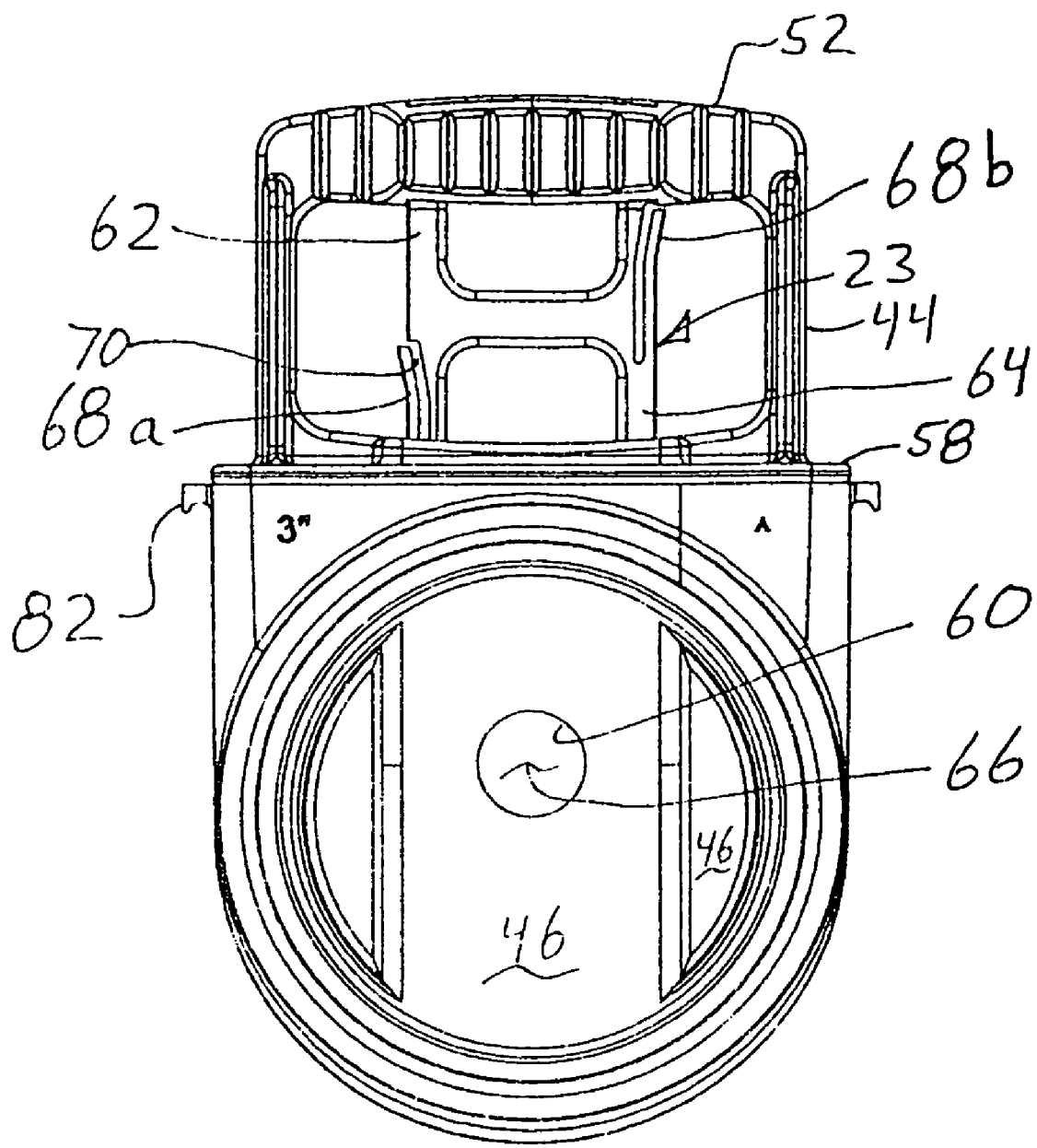
FIG. 17 shows an end view of the test slide of FIG. 1 taken along the flow path through the fitting of FIG. 1, with the test slide and pressure release slide in a closed position.
Figure 18:
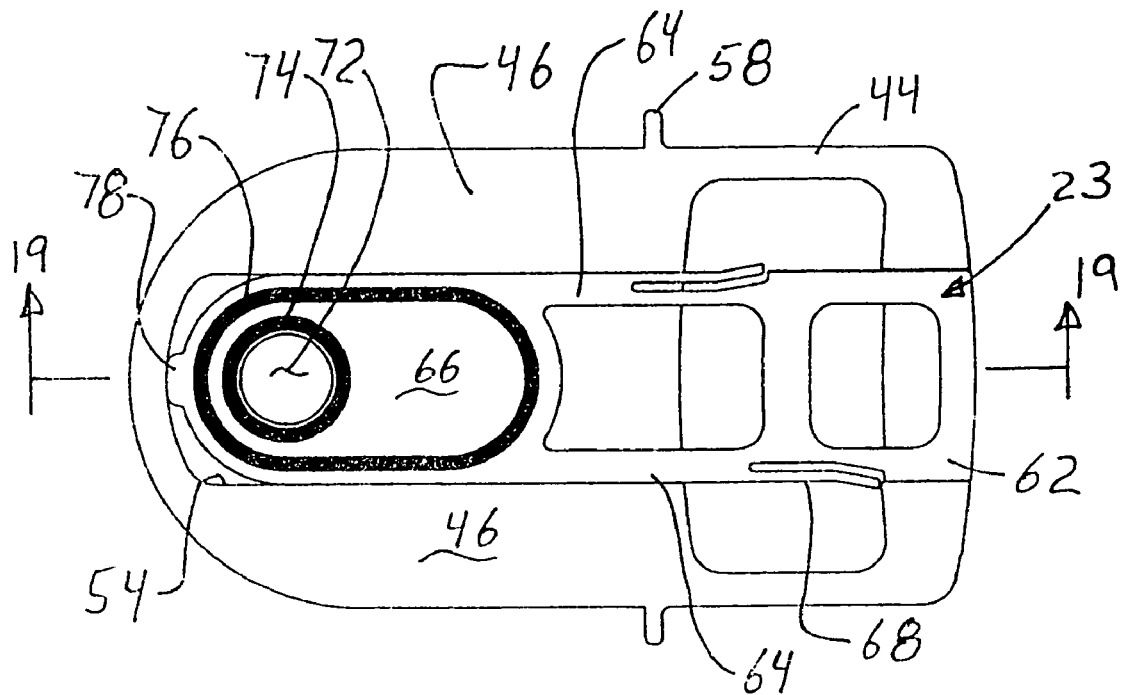
FIG. 18 is a plan view of the test slide of FIG. 1 with a pressure release slide in a closed position as in FIG. 17.

In a closed position reflected in FIGS. 17-19, the hole 72 is positioned to block flow through the test slide 22 and pressure release slide 23. In this closed position 72, 60 do not overlap so the seals surrounding the holes prevent flow through the slides 22, 23. The position is such that the first O-rings 72 sealingly engage the walls 48 of slide body 46 of the test slide 22 to block fluid flow through the hole 72. Fluid may enter the opening 60, but the second O-rings 76 sealingly engage the side walls 48 of the slide body 46 of the test slide 22 to prevent water from passing beyond the O-rings 74. The first O-ring 72 is enclosed within the second O-ring 74, but the O-ring 72 provides a fluid tight seal preventing fluid from passing through the hole 72. The latch 68b helps maintain this position.

Figure 14:
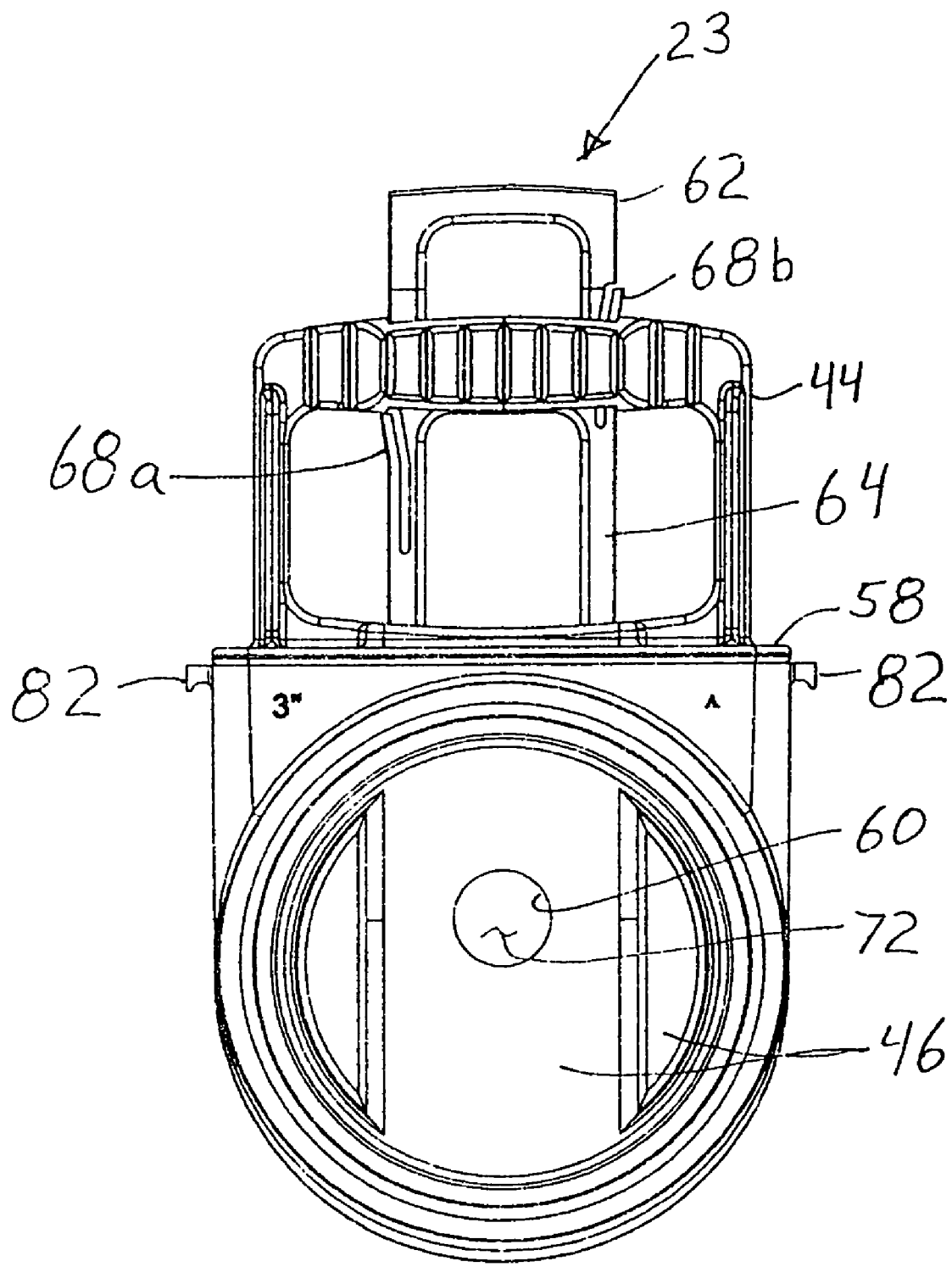
FIG. 14 shows an end view of the fitting of FIG. 1 taken along the flow path through the fitting of FIG. 1, with the test slide and pressure release slide in an open position.
Figure 15:
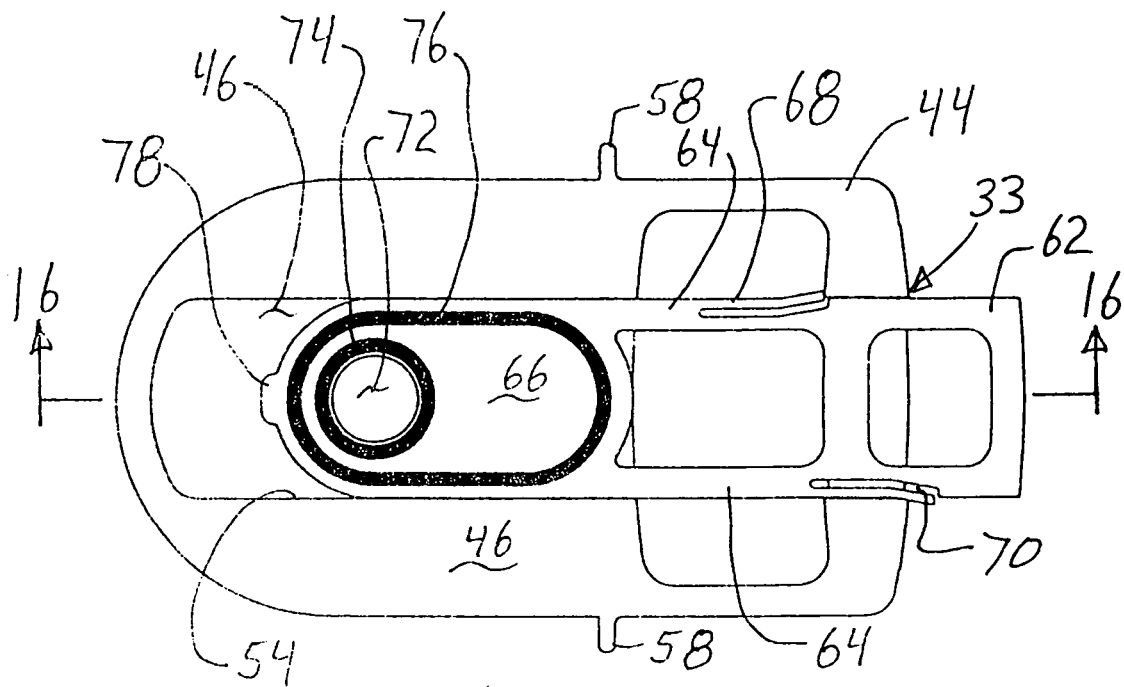
FIG. 15 is a plan view of the test slide of FIG. 1 with the pressure release slide in an open position as in FIG. 14.

In the partially open position reflected in FIGS. 14-16, the hole 72 is positioned so the hole 72 overlaps, and preferably aligns with hole 60 allowing fluid to pass through the holes in the test slide 22 and the pressure release slide 23. The position is such that the first O-rings 72 sealingly engage the walls 48 of slide body 46 of the test slide 22 around the hole 60. Fluid may enter the opening 60 and pass through the opening 72 to the other side of the test slide 22. The second O-rings 74 sealingly engage the side walls 48 of the slide body 46 of the test slide 22 to prevent water from passing beyond the O-rings 74, and provide a redundant seal in this position.

The seals 74, 76 could comprise D-ring seals, or other sealing surfaces. The seals could be placed in grooves 75, 77, or the seals could be integrally molded to one or more of the respective slides 22, 23 or surfaces 48. Resilient seals on the downstream side of the slides 22, 23 could be omitted in order to avoid compression of those seals and potential leakage on the upstream side of the slides 22, 23.

The distal end of the pressure release slide 23 is preferably, but optionally curved to mate with a correspondingly shaped end of the recess 54. Preferably, but optionally, a locking projection 78 extends from the distal end of the slide 23 a distance sufficient to engage a correspondingly located recess 79 (FIG. 18) in the fitting 20 in order to assist the pressure release slide 23 from moving axially along axis 21 under the influence of the high water pressure experienced during testing.

Referring to FIGS. 1, and 17-20, the operation of the test slide 22 is described. The fitting 20 is mated with at least one end 60 (FIG. 20) of a pipe in the pipe line. The ends 40a, 40b of the fitting 20 advantageously form female pipe sockets which are appropriately sized to receive the mating pipe ends 60 of the pipe line. Alternatively, the pipe end 60 could have female sockets and the ends 40 comprise male fittings. Further, ends 60 could be other types of fitting, adapters, or pipe ends which abut ends 40 and use other mechanisms to secure them in place. The ends 60 and ends 40 are mated and joined in a sealing manner by any of a variety of known ways, such as cementing, soldering, threading, abutting, using packing rings, etc., as appropriate to the material of the parts being joined. Advantageously the pipe ends 60 and fitting 20 are both made of a polymer, such as ABS (acrylonitrile-butadiene-styrene) or PVC (polyvinyl chloride) plastic and can be adhesively bonded. The parts could be made of dissimilar material or of cast iron, and joined by other ways suitable for joining the materials selected, including threads using pipe thread sealing compounds or hub-less devices using clamps.

The boss 36 that may optionally form part of recess 26 advantageously extends radially inward of the interior wall 30 of fitting 20 by an amount about the same as, and preferably slightly less than, the thickness of the wall of pipe end 60. The pipe end 60 preferably abuts the side walls of the boss 36 and preferably forms a substantially cylindrical surface defining the flow path through the fitting 20. A joint forming a slightly recessed surface along the longitudinal length of the boss 36 is preferred over a slightly protruding surface, and ideally the surfaces are flush. If cement is used to join the parts, the recess 42 allows any excess cement to collect in the recess 42 and thereby avoid a cement bead forming on a portion of the interior of the fitting 20. Alternatively, the boss 36 may be omitted entirely, and recess 34 and associated walls 38 may be formed directly into the interior surface 30 of the fitting. Moreover, the boss 36 is helpful to use when the fitting has female ends as the boss limits the insertion depths and allows formation of a glue trap at recess 42, but the boss is optional.

After at least one pipe end 60 is joined, if it is desired to pressure test the joined pipe line, then the test slide 22 is inserted into the port 26 so that the slide enters all portions of the recess 34 and the sealing surface 50 forms a seal around the circumference of the main fitting 20 to block flow through the fitting 20. The pressure release slide 23 is also inserted until it fully seats inside the test slide 22 to block fluid flow through the holes 60, 72. It may be inserted with the test slide 22, or after the test slide 22 is inserted and seated in the fitting 20. The pressure release slide 23, and is held in the closed position of FIGS. 17-19 by latch 68b (FIG. 17). Fluid is then introduced into the line to test for leaks under pressure. The distal end of test slide 22 advantageously does not abut the bottom of recess 34, but preferably leaves a gap comprising trap 39 so that any debris in the fitting can be urged by gravity into the trap 39 and thus avoid interfering with proper fitting and sealing of the test slide 22.

When the testing is completed, the pressure in the line is released by wholly or partially withdrawing the pressure release slide 23. The slide 23 is withdrawn from the fitting 20 and test slide 22 until the holes 60, 72 align and that opens a small hole through which pressure can be relieved. To do so, the locking releasable lock 68 is released. For the latch-type locking mechanism shown, this release is achieved by pressing the latch toward the slide 23 until it fits through the recess 56. The open configuration is shown in FIGS. 14-16. The small opening formed by aligning holes 60, 72 helps reduce the likelihood that the high pressure in the line will force the pressure release slide 23 out of the fitting 20 where it may injure someone. Further, the latch 68a (FIG. 14) engages the handle 44 to help prevent the slide 23 from being violently expelled from the fitting by the pressure in the line. Advantageously, the latch 68 also positions the hole 72 so it aligns with the hole 60 to allow water to pass through the test slide 22.

Because the holes 60, 72 are small, they are preferably located above the centerline of the fitting 20 so that equilibrium pressure is reached more quickly, without draining the entire line. Further, in the event that the pressure test needs to be repeated, the line is kept more full by locating the holes 60, 72 further above the centerline 21. Moreover, the hole 72 is preferably about the same size as the hole 60 so that there is uniform sealing adjacent the peripheries of both holes, and so there is no pressure imbalance on one side of the slide 23 or 22.

After the line pressure is sufficiently relieved by the pressure release slide 23, the test slide 22 is removed from the port 26, releasing the remainder of the fluid from the line for draining or for use. As the test slide 22 is removed, the distal end of sealing surface 50 exits the recess 34 in the bottom of the boss 36 so that fluid in the line passes the test slide 22. When the top portion of the sealing surface 50 disengages the wall 38 any resistance to fluid passage presented by sealing surface 50 at that location is lost. But since the pressure release slide 23 has released the pressure, there should be insufficient pressure to expel fluid out the recess 56 through which the slide 22 is withdrawn;

In addition to providing resistance to passage of fluid past sealing surfaces 44, 54 when they are engaged with wall 38, the sealing surfaces 44, 54 also provide resistance to movement of the test slide 22. This resistance helps prevent pressure in the fitting 20 from forcing the test slide 22 out of the port 26.

Referring to FIGS. 1 and 14-20, advantageously the port 26 extends vertically from about the centerline 21 of the fitting 20 so that the largest diameter of sealing surface 50 abuts, or comes very close to, the end walls of the rectangular port 26. The walls 38 are illustrated as forming a rectangular shaped port 26.

The flange 58 on handle 44 is preferably configured to be larger than the port 26. The flange 58 is located to limit the maximum insertion of the test slide 22 into the port 26 and to position the sealing surface 50 relative to the walls 38 to achieve a leak proof or leak resistant seal during pressure testing or use of the test slide 22. But there is an advantage if the flange 58 also extends beyond the port 26, because it then forms a barrier to any fluid squirting out the port 26 so the fluid is directed away from the hand of a person gripping handle 44 or 62.

Further, extending from opposing ends of flange 64 are locking tabs 82 which are located to be placed adjacent to, and preferably to abut, flange 58. A wire, string, plastic or other flexible member can be wrapped around the locking tabs 82 and through handle 44, and/or 62 to fasten the parts together. Other locking mechanisms can be used, such as a resilient latch and a mating engaging surface, each located on opposing parts. An advantage of locking tabs 82 is that an inspector can fasten the parts with colored wire or plastic, and after a predetermined testing time can check to see if the plastic is disturbed, with any disruption in the connection of the locking tabs providing evidence of tampering during the testing.

It is possible to place a seal intermediate the bottom of the flange 58 and the top, exterior surface defining the port 26. This would be a seal located perpendicular to the axis along which the slide 22 travels during its insertion and removal. Such a seal could comprise a groove on one of the flange 58 or top surface defining the port 26, along with a mating sealing ring placed in the groove. Any pressurized fluid will exert a force against flange 58 and that could urge the flange 58 away from the fitting 20 and reduce the effectiveness of any seal on the surface perpendicular to the travel of the test slide 22.

Referring to FIGS. 20-21, the finish slide 24 will be described. The finish slide 24 is configured to fit within the recess 34 and allow fluid flow through both the finish slide 24 and the main fitting 20, while sealing the port 26. The finished slide thus has a slide body 86 having an opening 86 therein. The opening 86 advantageously corresponds in shape and size to the interior diameter of the boss 36 so that when the slide 24 is inserted into the recess 34, preferably, but optionally, a substantially cylindrical surface is formed having the same internal diameter as the boss 36. If the boss 36 has been omitted as previously discussed, this same cylindrical relationship is then formed between the opening 86 and the inside surface 30 of the fitting 20.

When the pipe ends 60 are inserted into the fitting 20 they advantageously have a uniform wall thickness which corresponds to the amount that the boss 36 extends into the interior of main fitting 20 so there is preferably, but optionally, a substantially uniform diameter flow passage formed through fitting 20. As used in the description, "substantially" refers to dimensions varying about 15% or less of the thickness of the walls of pipes 60 or the walls 28, and preferably refers to dimensions varying less than 10% of the wall thickness. This readily accommodates changes as might arise in misalignments and dimensional changes of manufacturing. Ideally, there are no protrusions or misalignments that would prevent the main fitting from meeting plumbing code requirements for drain, vent and waste lines, or for other applicable regulatory requirements such as for water lines. Those regulatory codes typically preclude protrusions or recesses that might collect debris in pipes and thereby lead to undesirable contamination or restriction of the fluid flow through the pipe line.

The opening 86 is defined by walls 88 that are generally parallel to the longitudinal axis 21 and the interior surface 30 (FIG. 1) of wall 28. The thickness of the finish slide 24 along the longitudinal axis 21 is slightly less than the width of the corresponding portions of the recess 34 into which the slide 24 fits when installed. A close fit is desired, with some slight gap between adjacent parts being acceptable—depending on the type of fluid passing through the pipe line. Preferably, the fit is close enough so as to allow insertion of the finish slide into the recess with a thin layer of cement interposed between abutting surfaces so that the surfaces are bonded together to form a seal around the circumference of the fluid flowing through the slide 24 and through the fluid passage in the fitting 20.

The finish slide 24 has a flanged exterior end 90 which is larger than the port 26. The flanged end 90 is located relative to the opening 86 so as to limit the maximum insertion of the finish slide 24 into the port 26 and to position the walls 88 defining opening 86 in the slide 24 so that the opening 86 aligns with the interior of the passage through fitting 20. A rectangular sink 92 is formed in the flanged end 90. The sink 92 has a long axis aligned with the long axis of the rectangular cross section of the slide 26, and is centrally located. The interior end of the sink 92 is preferably, but optionally, semi-circular shaped and concentric with the opening 86. The sink 92 forms a recess that avoids material shrinkage and sinking of the surface as the molded slide 26 cools, and it also serves as a material saver.

The flanged end 90 has a body portion 94 which extends into the top end of port 26 and which is preferably configured with dimensions slightly larger than those of the engaging portions of port 26 so as to form an interference fit and a tight seal when inserted into port 26. An interference fit of about 10-15 thousands of an inch is believed suitable. The slight interference fit is small enough so that if the body portion is formed of a thermoplastic polymer (e.g., ABS, PVC, etc.) then the cement placed on one or both of the parts melts the polymer and the slight interference fit causes a wiping action with the abutting walls forming port 26 to ensure fluid-tight bonding of the body portion 94 to the abutting walls forming port 26.

The distal end of finish slide 24 preferably ends before abutting the wall 28, so as to leave trap 39 available to collect debris and avoid any blockage that might prevent slide 28 from aligning the opening 86 with the interior of the passage through the fitting 20 as needed. The finish slide 24 is preferably bilaterally symmetric so that it can be inserted into the port 26 and form a sealing engagement in either of two orientations.

The finish slide 24 is preferably but optionally, also provides a preconfigured flow surface on the inside of the fitting. The preconfigured flow surface is preferably shaped so that the interior flow passage of the fitting reduces the collection of debris from the fluid flowing through the fitting during use of the plumbing line. Advantageously it provides a substantially continuous surface with no substantial recesses, cavities or protrusions, and especially provides a surface lacking such discontinuities as would be prohibited under plumbing codes for such pipe lines.

The use of the finish slide 24 will now be described. After pressure testing is completed, the test slide 22 and its pressure release slide 23 are removed and replaced with the finish slide 24. Advantageously, an adhesive is interposed between the surfaces of the finish slide 24 and the portions of the recess 34 and port 26 which will abut, so as to form a permanent connection, and to ensure a fluid tight connection. This can be achieved by placing an adhesive on the abutting surfaces of one or both of the slide 24 and the inside periphery of port 26, and then inserting the slide 24 into the port 26. Advantageously the adhesive is placed on the generally vertical walls of the upper portion 94 of slide 24 that abut walls 38 of the port 26 so that an adhesive joint is formed vertically. Advantageously the adhesive is also placed on the generally horizontal surfaces of the underside of flange end 90 so that an adhesive joint is also formed horizontally. Thus, the finished flange is adhered to the fitting 20 along two generally perpendicular axes. Advantageously, the finish slide 24 has the same color as the fitting 20 so that a visual inspection can determine the finish slide is being used.

Acceptable results may be obtained by applying the adhesive to fewer surfaces. Alternatively, but less preferably, the adhesive can be omitted and other sealing and fastening mechanisms used to ensure the assembly of the fitting 20 and the finish slide 24 does not leak and the finish slide is not inadvertently removed. Such mechanisms could include an interference fit, O-rings, threaded fasteners such as screws joining the parts, latches extending between the fitting 20 and slide 24, flexible or rigid connections with opposing ends fastened to the slide 24 and fitting 20, and a variety of other mechanisms.

If the fitting 20 is made of a thermoplastic polymer (e.g., PVC, ABS, etc.), then the test slide 22 is preferably in place when the fitting 20 is bonded to any of the adjacent pipe line 60 in order to avoid any overflow of bonding adhesive from entering the recess 34 and inhibiting later entrance of the slides 22, 24 into and out of that recess. Preferably, the main fitting 20 is made of PVC or ABS, with the finish slide 24 being made of the same material as the fitting 20 to make the adhesive bonding to the fitting 20 easier. On the other hand, the test slide 22 is preferably made of a material different from the fitting 20, and preferably is made of a polymer such as EPDM or a fluoroelastomer that will not adhere to the fitting 20 with common pipe cements. This helps avoid accidentally gluing the test slide 22 in place instead of the finished slide 24. Other potentially suitable materials for test slide 22 include propylene rubber, Teflon, silicon rubber, or TPE (thermo-plastic elastomer). The slides 22, 23, 24 can be cast, machined, injection molded, compression molded or blow molded, depending on the materials used. Injection molded elastomers are believed preferable.

While the test slide 22, pressure release slide 23 and finish slide 24 are preferably molded integrally of a single material with the various sealing surfaces 50 or recesses for receiving various sealing rings, one or more of them can also be molded around an insert of metal or other material to provide additional strength and rigidity. This molding over a strengthening frame or insert can be particularly useful as it allows the exterior mating surfaces of the test slide 22 to be made of a resilient material that may readily form a good seal with the abutting surfaces of the port 26 and recess 34. An EPDM material compression molded onto a steel insert is believed suitable, as is a TPE material overmolded onto a molded nylon insert. Further, the fitting 20, test slide 22, pressure release slide 23 and finish slide 24 could be made of metal, and if so the fitting is preferably made of cast iron.

The main fitting 201s preferably injection molded of a polymer and used with pipes of the same or similar material. The fitting 20 could be made by other means. Referring to FIGS. 23-24, the main fitting 20 can also be used with pipes of different material, such as cast iron pipes 60, and the fitting 20 could be made of metal suitable for use in the particular pipe line involved. If dissimilar materials are used the pipes can be joined and sealed in various ways. For example, couplings can be inserted inside or enclosed around the abutting end of the pipes and/or fittings so the coupling extends across the abutting ends, held in place by hose-clamps.

In some cases, the pipes 60 may have flanged ends 93. A tubular insert 94 can be inserted into the end of the main fitting 20 to be joined to the cast iron pipe 60. The insert 94 is preferably, but optionally glued in place into fitting 20. The inner diameter of the tubular insert 94 is selected to be about the same as, or slightly larger than the inner diameter of pipe 60. The inner diameter of boss 36 and inner walls 88 defining opening 86 are about the same as, or slightly larger than the inner diameter of tubular insert 94. That construction provides a slightly larger diameter flow passage through the main fitting 20, which helps avoid the collection of debris. Advantageously there are no reduced diameters or protrusions into the flow path of fluid flowing through the main fitting 20 as would encourage the accumulation of debris.

The tubular insert 94 provides a larger abutting surface area for joining to the flanged end of pipe 60. They may be joined and sealed against leakage by methods common to the plumbing practice, such as tubular rubber or polymer couplings and band clamps.

FIGS. 22-23 show a further embodiment of this invention in which a fill drain is provided in which a fluid passage 96 extends from outside the fitting 20 to be placed in fluid communication with the fluid passage through fitting 20. The fluid passage 96 can be achieved many ways. The fluid passage 96 can be placed is in fluid communication with a pressurizing fitting or pressurizing connection 102 for coupling a source of pressurizing fluid to the fluid passage inside the fitting 20. A second, inlet end 104 of the fluid passage 96 is advantageously adapted to connect to a pressurized water supply, such as a garden hose connected to a municipal water supply. The connection is advantageously achieved by making the fluid connection 102 a threaded fitting connected to inlet end 104 and configured to receive the end of a garden hose. Either a male or female fitting may be selected, depending on the ease of manufacture and whether or not it is deemed acceptable to require the plumber to carry special-purpose hoses or adapters.

The fluid passage 96 comprises a fill and drain port 111 formed in fitting 20, preferably located to either side of recess 34 and preferably radially outward of the longitudinal axis 21 of fitting 20. The port 111 provides an opening extending from outside the fitting 20 to the inside of the fitting. The coupling 102 allows a fluid line to be coupled to the port. The coupling 102 is preferably configured to receive a garden hose is preferred, as discussed above, but other sizes and shapes could be used.

The port 111 allows a water or air supply to be connected to the fitting 20 so that pressurized water or air can be introduced into the upstream side of the pipe line being tested. When finished, the pressure is released by at least partially removing the pressure release slide 23 and/or test slide 22, or optionally by allowing drainage through the port 111. A cap or plug is then applied to the port 111 to reseal the pipe line. For pressure testing the pipe line, the pressuring fluid need not be connected to the fitting 20, but could be connected to other portions of the pipe line through various means known to those skilled in the art. Preferably though, the pressurizing fluid is provided through the fitting 20.

In order to avoid interference with any pipe which may be inserted into the ends 40 of fitting 20, and depending on the type of pipe application intended, this configuration may require that the fitting 20 be made asymmetrical, extending features of the fitting 20 to a greater degree on the side where drain port 111 is located so that any joining ends of the pipe line do not abut the coupling or port 111. The port is advantageously formed through the boss 36 if the boss is present. The port 111 is preferably located in the same angular orientation as port 26, with respect to the longitudinal axis of the fitting 20, so that a plane through the longitudinal axis 21 passes through a central axis of both the port 26 and the port 111. But other locations could be used, and the port 111 in FIGS. 24-25 extends at a right angle relative to the port 26. If the port 111 is formed on the vertically bottom side of the fitting 20 when installed, the port 111 could be used to drain the line after testing. As mentioned, when testing is completed, a cap or plug (not shown) is installed onto at least one of the coupling 102 and port 111 to seal the port. A permanent adhesive is preferably used to permanently seal the port and prevent removal of the cap or plug and un-sealing of the port, but this is optional.

Figure 26:
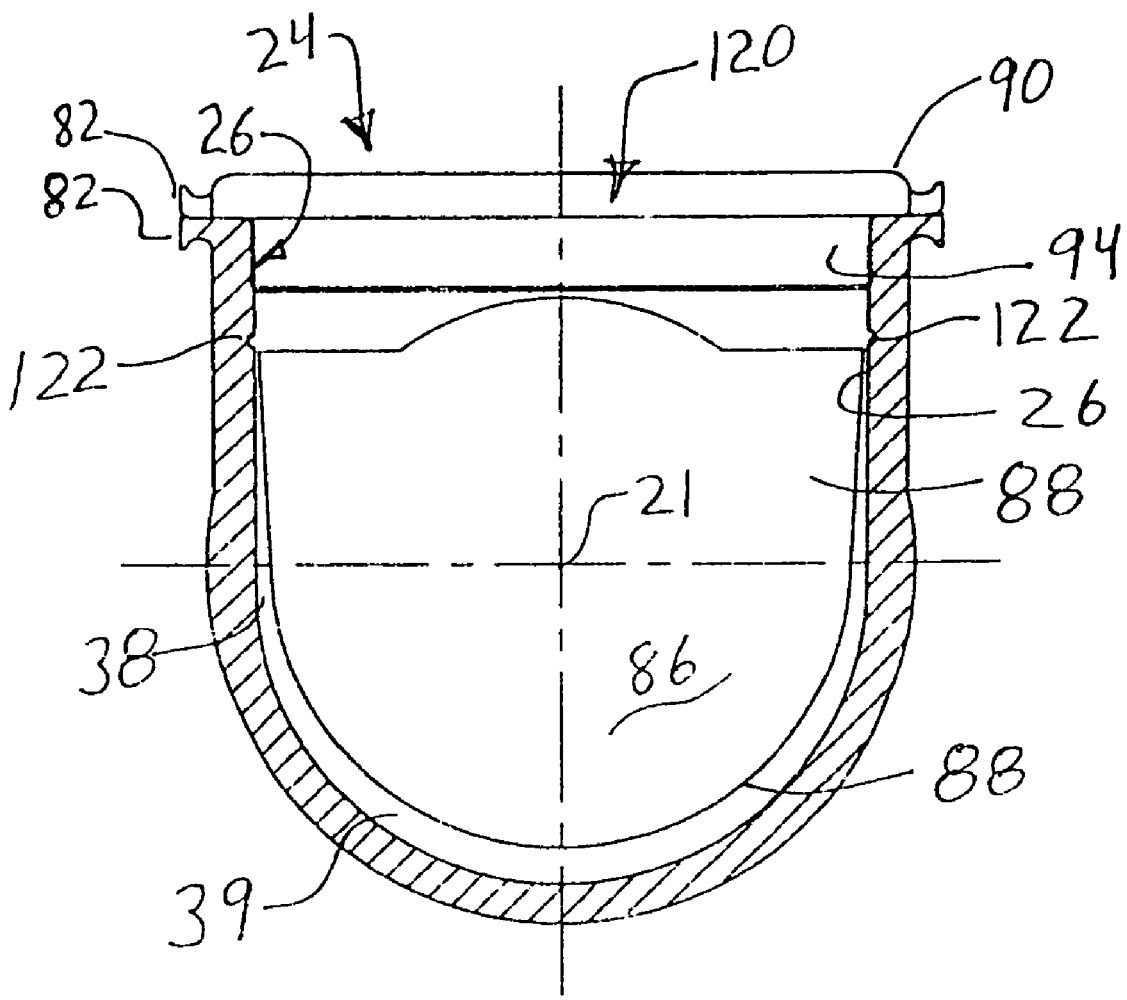
FIG. 26 is a sectional view along section 23-23 of FIG. 22 showing a further embodiment of a finish slide.

Referring to FIG. 26, a further embodiment is shown in which the finish slide lacks any distal portion completely defining a circular opening 86, or entirely omitting opening 86. There is thus shown a cap 120 having a flanged end 90 as previously described on finish slide 22. The cap 120 also has body portion 94 as previously described. Advantageously the cap 120 terminates after the body portion 94. This leaves the remainder of the port 26 and recess 34 open and results in a fluid passage that is not smooth and not continuous. Thus, preferably, but optionally, at least some portions of the distal body defining opening 86 could be included to form a continuous flow surface over the location of the recess 34. The main purpose of the cap 120 is to seal the port 26 while not necessarily filling or covering all of the recess 34, and the body portion 94 can achieve that seal when it is glued to the walls defining port 26.

A secondary and optional use of the cap 120 is to fill a portion of the port 26 and/or recess 34 intermediate the longitudinal axis 21 and the body portion 94 to provide a smoother flow path to that portion of the fluid passage by providing a substantially continuous surface with not substantial recesses, cavities or protrusions, and especially lacking such discontinuities as would be prohibited under plumbing codes for such pipe lines.

Preferably, but optionally, a slightly raised sealing surface 122 extends around the distal end of body portion 94 and is located to engage the walls defining port 26. A seal height of 10-15 thousandths of an inch is believed sufficient for the sealing surfaces 122. The sealing surface 122 allows a temporary seal in the event it is needed before permanently fastening the cap 120 to fitting 20 to seal port 26. The distal end of cap 120 advantageously terminates with body portion 94, but the distal end can also be constructed to extend into a portion of the recess 34 and form a smooth surface across the recess as in finish slide 24. Preferably the distal end of the cap 120 does not extend beyond the middle of the flow passage through the fitting 20. That leaves a portion of recess 34 open, and leaves the trap 39 open if the recess is formed to contain a trap 39.

Advantageously locking tabs 82 extend from the cap 120 to align with locking tabs 67 on the fitting 20. A fastener can connect to the tabs 82 in order to indicate that the cap 120 and/or entire finish slide 24 is locked into position.

Referring to FIGS. 27-31, a further embodiment of this invention is shown in which the previously described fitting 20 comprises a modified fitting 220 (FIGS. 32-37) that is optionally, but typically, made of metal, such as cast iron. An insert 221 is placed into the fitting 220, with the insert 221 being configured to hold the test slide 22 and finish slide 24.

The fitting 220 has a fluid passage extending therethrough along centerline 21 with the fluid passage defined by walls 28 of the fitting 220. An exteriorly accessible opening or port 226 opens into a recess 234 that is generally orthogonal to the longitudinal axis 21 and the fluid flow path. The recess 234 extends around the periphery of the fluid flow path through the fitting 220. As shown, it comprises a generally rectangular opening at the port 226. Flanges 282 are formed at opposing ends of the fitting 220, the flanges preferably extending away from centerline 21.

Referring to FIGS. 32-36, the insert 221 has an exterior surface configured to correspond with the recess 234. Seals 250 are provided on opposing faces of insert 234 to engage walls forming the recess 234 in a sealing engagement around an opening 272 corresponding to the location of the flow path through the fitting 220 when the insert 221 is seated in the recess 234. As illustrated, the opening 272 comprises a circular opening extending through the insert 221. The insert 221 has an internal cavity formed by a port 26 that opens into recess 34 defined by walls 38 as previously described. A trap 39 preferably is provided, as previously described.

The insert 221 is preferably made of plastic and is configured so that it can be inserted into the recess 234 of the cast iron fitting 220 in order to allow the previously described slides 22, 24, and variations thereof, to be used with cast iron pipe lines 60. The end flanges 282 can be joined to correspondingly shaped end flanges on cast iron pipe lines 60 by radial compression clamps, such as hose clamps, with a sealing sheath or cylindrical sealing material interposed between the clamp on the one side, and the fittings and pipes on the other side.

The insert 221 is preferably of a softer material than the fitting 220 so that the insert 221 can be press fit into the recess 234 to not only hold the insert in place, but to form a fluid tight seal. As mentioned, the insert is preferably of plastic, and as such could be press-fit into a cast-iron fitting 220, or overmolded to the fitting 220. A plastic insert 221 could be glued in place, ultrasonically bonded in place, or a gasket inserted around port 226 as needed to prevent leakage.

The insert 221 could be of metal, such as cast iron, or other material compatible with the fitting 220. If made of metal, the insert 221 is preferably of a softer material than the fitting 220, such as brass, aluminum, copper, so that the fitting can be press fit into the recess 234. Advantageously, the insert 221 forms a fluid tight seal with the recess 234 so no fluid leaks out of the juncture between the insert 221 and fitting 220. Adhesives or sealants can be used as appropriate. The insert 221 preferably has flanges or locking tabs 82 as previously described in order to allow the insert 221 to be positively fastened to test slide 22 or finish slide 24 as previously described.

While the insert 221 is preferably press-fit into the recess 234, a positive fastening device could be used. Thus, flanges could be provided on one or both of the insert 221 and fitting 220, with bolts, wire, spring locks, or other fastening mechanisms being used to positively fasten the parts together. Further, the insert preferably has locking tabs 82 adjacent port 26 for use in fastening to slides 22, 24 or 23 as previously described.

There is thus advantageously provided a non-removable insert 221 configured to be placed in a recess 234 in a fitting 220 to define a flow path through the fitting and insert. The insert 221 in turn has an exteriorly accessible access port 26 through which test and finish slides 22, 24 can be inserted to block the flow path through the fitting 220. Once installed, the insert 221 effectively becomes part of the fitting 220. The finish slide 24 can be fastened to the insert 221 as previously described, and the test slide 22 can be used with the insert 221 as previously described. For ease of illustration the portions of the insert 221 that mate with the test slide 22, finish slide 24, and pipe line 60 are not described in detail, but it is understood that the various features previously described could be used with the insert 221.

Referring to FIGS. 37-38, a further embodiment of the test slide 22 and pressure release slide 23 are shown. A test slide 22 has walls 48a, 48b defining an internal recess within which the pressure release slide 23 moves. Holes 60 are formed in each opposing wall 48a, 48b, but the hole in each wall is not aligned. The hole 60 in the downstream wall 48b is offset toward the bottom of the flow channel through the fitting 20 (FIG. 1). The pressure release slide 23 has no hole in it. Instead, it has two seals 277 sealingly engaging the walls 48 of the recess within which the slide 23 moves so that when the seals 277 are on opposing sides of the opening 60 on the upstream side of the test slide 22 (FIG. 32), no fluid flows through the test slide, and when the seals 277 are on the same side of the upstream hole 60 (FIG. 33), fluid flows through the test slide 22.

Figure 2:
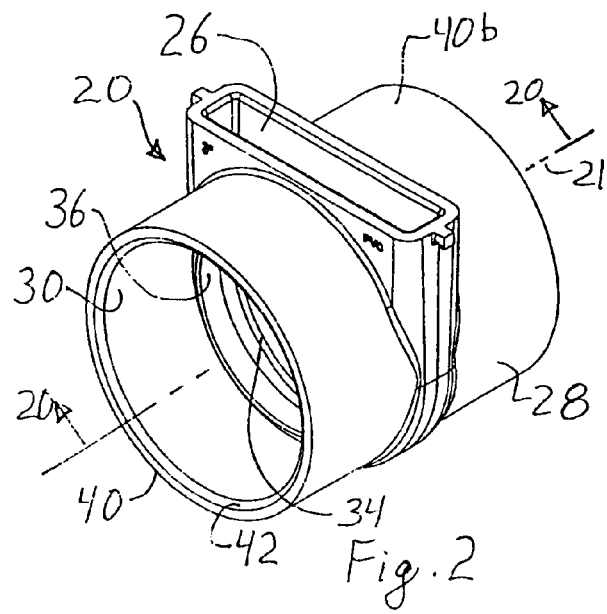
FIG. 2 shows a perspective view of the fitting of FIG. 1.
Figure 3:
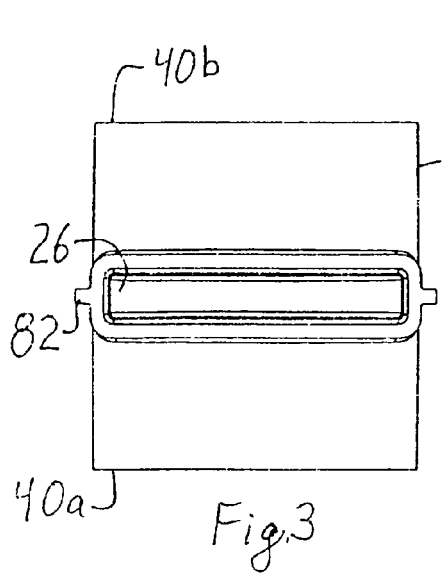
FIG. 3 shows a top, plan view of the fitting of FIG. 1.
Figure 4:
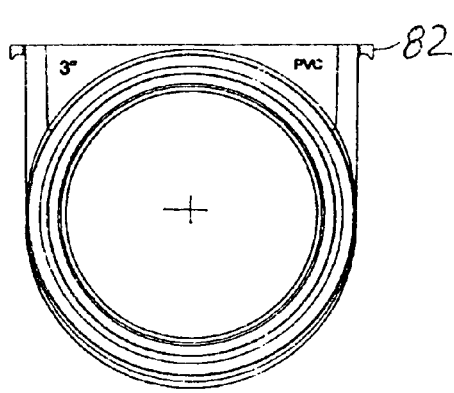
FIG. 4 shows an end view of the fitting of FIG. 1 taken along the flow path through the fitting of FIG. 1, with the opposing end view being a mirror image thereof.
Figure 5:
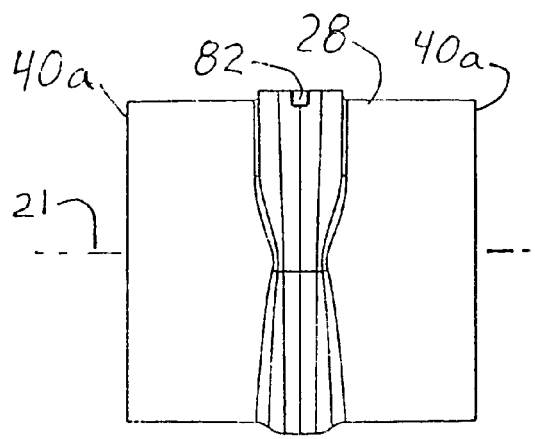
FIG. 5 shows a side view of the fitting of FIG. 1, with the opposing side view being a mirror image thereof.

This flow can be achieved various ways, but preferably the seals 277 comprise axial seals that encircle the pressure release slide 23 in a plane that is generally perpendicular to the flow of fluid through the fitting (FIG. 2) and generally parallel to the axis 21 (FIG. 2). In this embodiment, the recess in the test slide 22 within which the pressure release slide moves is preferably cylindrical in cross-sectional shape, and the pressure release slide 23 is preferably cylindrical in shape so O-ring seals 277 can be placed over the round exteriors and form fluid tight seals. A rectangular cross-sectional shape can be used for the slide 23 and the recess within which it moves, but that shape is harder to seal than a cylindrical, plunger type slide 23 and a mating cylindrical recess. In the depicted embodiment, there are two axial seals 277 encircling the slide 23, but more seals could be used to ensure a fluid tight assembly.

Further, face seals located in the plane in which the slide 23 moves, could also be used instead of axial seals, with the fluid flowing below the slide 23 when it is moved to unseal the hole 60 on the upstream side. If face seals are used, the holes 60 could be aligned. But when axial seals are used fluid can fill the space between two adjacent seals 277 so the holes 60 on the upstream and downstream sides of the test slide 22 must be mis-aligned. The mis-alignment of holes 60 preferably has the downstream hole 60 lower than the upstream hole 60 so that gravity will cause the fluid to flow through the test slide 22.

As reflected by FIGS. 37-38, the pressure release slide 23 can take various shapes, as can the mating portion of the test slide 22 which cooperates with the slide 23 to open and close hole(s) 60 to release the pressure on the upstream side of the fitting 20. The above described embodiments have the pressure release slide 23 supported and sealed on both the upstream and downstream sides of the slide 23, but a seal could be used on only one side, either the upstream or the downstream side. Further, while the pressure release slide 23 is shown enclosed within the recess in the test slide 22, the recess could be open on the downstream side if only one face (the upstream face) of the slide 23 is sealed. The pressure release slide 23 has either an opening 60 to allow fluid flow through the slide 23 and test slide 22, or it is configured and located so that fluid flows around the slide 23 in the open position while flow is blocked in the closed position.

The recess 34 in the fitting cooperates with the insert 221 and test slide 22 to provide a means for sealing fluid flow through the test slide. Further, the various seals 51 76 and 277 provide means for sealing the internal periphery of the fitting and test slide 22 and blocking fluid flow through the fluid passage of the fitting 20 during use of the fitting. The seals 74, 76, 221 in cooperation with a changed position of the pressure release slide 23 also provide second means for allowing fluid flow through the first means when in an open position and for blocking fluid flow through the first means in a closed position.

The above description is given in relation to a pipe line of the type used in the water supply or drainage system of homes, apartments and other buildings. But the apparatus and method are applicable to any tube through which a fluid passes, where fluid includes gases, liquids, or combinations thereof, or solids entrained in gases or liquids, or combinations thereof, and the reference to pipe lines is to be read broadly to encompass such tubes and various applications unless stated or described otherwise.

The above description is given by way of example, and not limitation. Given the above disclosure, one skilled in the art could devise variations that are within the scope and spirit of the invention, including various ways of configuring the slides and sealing the slides to the fitting. Further, the various features of this invention can be used alone, or in varying combinations with each other and are not intended to be limited to the specific combination described herein. Thus, the invention is not to be limited by the illustrated embodi-

We claim:

1. A finish slide for use with a pressure testing system for a pipe fitting having walls defining a fluid passage there through with a first diameter, and a recess extending around a circumference of the fluid passage, the recess having opposing walls spaced a first distance apart measured along a longitudinal axis of the fluid passage, the fitting having a port allowing external access to the recess sufficient to allow insertion of the finish slide into the recess, the finish slide comprising:
   a finish slide having a body portion configured to fit into and mate with the port of the fitting, the finish slide having a wall sized to fit in the recess and defining a circular opening corresponding to the first diameter;
   a first seal interposed between the port and the body portion and providing a fluid tight seal between the port and the body portion when the finish slide is inserted into the port, wherein the finish slide is tapered so the slide has a length measured parallel to the longitudinal axis near the body portion that is greater than a length measured parallel to the longitudinal axis near the recess.

2. The finish slide of claim 1, further comprising a second seal, the second seal being located on the wall of the finish slide and orientated to abut one of the opposing walls of the recess.

3. The finish slide of claim 1, wherein the first seal comprises a ring seal.

4. The finish slide of claim 2, wherein the second seal comprises a ring seal.

5. A finish slide for use with a pressure testing system for a pipe fitting having walls defining a fluid passage there through with a first diameter, and a recess extending around a circumference of the fluid passage, the recess having opposing walls spaced a first distance apart measured along a longitudinal axis of the fluid passage, the fitting having a port allowing external access to the recess sufficient to allow insertion of the finish slide into the recess, the finish slide comprising:
   a finish slide having a body portion configured to fit into and mate with the port of the fitting, the finish slide having a wall sized to fit in the recess and defining a circular opening corresponding to the first diameter;
   a first seal interposed between the port and the body portion and providing a fluid tight seal between the port and the body portion when the finish slide is inserted into the port, wherein the first seal comprises an adhesive.

6. The finish slide of claim 1, wherein the first seal includes an interference fit between the body portion and the walls defining the port.

7. The finish slide of claim 1, wherein a length of the finish slide along the longitudinal axis is slightly less than the corresponding first distance of the recess when the longitudinal axis of the circular opening coincides with the longitudinal axis of the fitting.

8. The finish slide of claim 1, wherein the wall of the finish slide has a length measured along the longitudinal axis which length corresponds to the first distance, so that when the slide is inserted through the port into the recess, the walls defining the opening cooperate with the walls on opposing sides of the recess to provide a fluid passage having a substantially uniform diameter over the recess and adjacent walls forming the recess along the longitudinal axis.

9. The finish slide of claim 1, wherein the body portion includes an flange extending in a direction parallel to the longitudinal axis.

10. The finish slide of claim 1, wherein the body portion includes a flange that is larger than the port and orientated to abut an exterior facing surface of the fitting during use of the slide.

11. The finish slide of claim 1, wherein the body portion includes a flange that is larger than the port, the flange being located control the insertion of the finish slide into the port to position the circular opening.

12. A finish slide for use with a pressure testing system for a pipe fitting having walls defining a fluid passage there through with a first diameter, and a recess extending around a circumference of the fluid passage, the recess having opposing walls spaced a first distance apart measured along a longitudinal axis of the fluid passage, the fitting having a poll allowing external access to the recess sufficient to allow insertion of the finish slide into the recess, the finish slide comprising:
   a finish slide having a body portion configured to fit into and mate with the port of the fitting, the finish slide having a wall sized to fit in the recess and defining a circular opening corresponding to the first diameter;
   a first seal interposed between the port and the body portion and providing a fluid tight seal between the port and the body portion when the finish slide is inserted into the port, wherein the finish slide has a flange around the body portion, the flange configured to overlap and abut a surface of the fitting during use, the finish slide further comprising a seal around the port, the seal being located between the flange and fitting and further located perpendicular to the axis along which the slide travels during insertion of the slide into the fitting.

13. The finish slide of claim 1, wherein the fitting has a color and the finish slide has a color, the colors being the same.

14. The finish slide of claim 1, further comprising screws for fastening the finish slide to the fitting during use of the finish slide.

15. The finish slide of claim 1, wherein the wall forming the circular opening is configured to cooperate with the recess to provide a substantially continuous fluid passage to the pipe fitting during use of the finish slide.

16. The finish slide of claim 1, wherein the port has a rectangular shape.

17. The finish slide of claim 1, further comprising a locking member for fastening the finish slide to the fitting during use of the finish slide.

18. A finish slide for use with a pressure testing system using a pipe, the system using a fitting having walls defining a fluid passage there through with a first diameter, and a recess extending around a circumference of the fluid passage, the recess having opposing walls spaced a first distance apart measured along a longitudinal axis of the fluid passage, the fitting having a port allowing external access to the recess sufficient to allow insertion of the finish slide into the recess, the finish slide comprising:
   finish slide means for filling the port and at least a portion of the recess; and
   means for sealing the port.

19. The finish slide of claim 18, wherein the finish slide fits into the recess along the longitudinal axis.

20. The finish slide of claim 18, wherein the finish slide means extends around the entire fluid passage.

21. The finish slide of claim 20, further comprising means for providing a fluid seal between the slide means and the recess extending around the fluid passage.

* * * * *